US009009060B2

(12) United States Patent
McNally

(10) Patent No.: US 9,009,060 B2
(45) Date of Patent: Apr. 14, 2015

(54) INFORMATION MANAGEMENT AND SYNCHRONOUS COMMUNICATIONS SYSTEM

(75) Inventor: Keith R. McNally, San Diego, CA (US)

(73) Assignee: Ameranth, Inc., San Diego, CA (US)

( * ) Notice: Subject to any disclaimer, the term of this patent is extended or adjusted under 35 U.S.C. 154(b) by 2314 days.

(21) Appl. No.: 11/190,633

(22) Filed: Jul. 26, 2005

(65) Prior Publication Data

US 2006/0020497 A1  Jan. 26, 2006

Related U.S. Application Data

(63) Continuation-in-part of application No. 11/112,990, filed on Apr. 22, 2005, now Pat. No. 8,146,077, which is a continuation of application No. 10/016,517, filed on Nov. 1, 2001, now Pat. No. 6,982,733, which is a continuation-in-part of application No. 09/400,413, filed on Sep. 21, 1999, now Pat. No. 6,384,850.

(51) Int. Cl.
*G06Q 50/12* (2012.01)
*G06Q 10/02* (2012.01)
(Continued)

(52) U.S. Cl.
CPC ............... *G06Q 50/12* (2013.01); *G06Q 10/02* (2013.01); *H04L 63/083* (2013.01);
(Continued)

(58) Field of Classification Search
CPC ........ G06Q 50/12; G06Q 30/06; G06Q 20/20
USPC ............................................................ 705/5
See application file for complete search history.

(56) References Cited

U.S. PATENT DOCUMENTS 4,530,067 A  7/1985 Dorr
5,003,472 A  3/1991 Perrill et al.
(Continued)

FOREIGN PATENT DOCUMENTS

EP  0779759 A2  6/1997
GB  2196766 A  5/1988
(Continued)

OTHER PUBLICATIONS

Complaint for Patent Infringement, Jun. 28, 2007, *Ameranth, Inc. v. Menusoft Systems Corporation and Cash Register Sales & Service of Houston, Inc. (dba CRS Texas),* 2-07-CV-271, (E.D. Tex.).
(Continued)

*Primary Examiner* — Brian Epstein
(74) *Attorney, Agent, or Firm* — John L. Rogitz

(57) ABSTRACT

An information management and synchronous communications system and method facilitates database equilibrium and synchronization with wired, wireless and Web-based systems, user-friendly and efficient generation of computerized menus and reservations with handwritten/voice modifications for restaurants and other applications that utilize equipment with nonstandard graphical formats, display sizes and/or applications for use in remote data entry, information management and communication with host computer, digital input device or remote pager via standard hardwired connection, the internet, a wireless link, printer or the like. Various operations employing automated telephone calls and/or messaging may, for instance, be performed. For example, desired reservation and/or appointment information may be automatically converted and conveyed to one or more entities via automated telephone call and/or messaging. As another example, information regarding reservation acceptability may be received and automatically converted via automated telephone call and/or messaging. Telephones may, for instance, be the only equipment required by the entities.

23 Claims, 9 Drawing Sheets

(51) Int. Cl.
  *H04L 29/06*    (2006.01)
  *H04M 3/493*   (2006.01)
  *G06Q 30/06*   (2012.01)

(52) U.S. Cl.
  CPC ....... *H04M 3/4938* (2013.01); *H04M 2201/60* (2013.01); *H04M 2203/1058* (2013.01); *H04M 2203/2016* (2013.01); *G06Q 30/0621* (2013.01); *G06Q 30/0623* (2013.01); *G06Q 30/0641* (2013.01); *G06Q 30/0643* (2013.01)

(56) References Cited

U.S. PATENT DOCUMENTS

| | | | |
|---|---|---|---|
| 5,510,979 | A | 4/1996 | Moderi et al. |
| 5,724,069 | A | 3/1998 | Chen |
| 5,802,526 | A | 9/1998 | Fawcett et al. |
| 5,845,263 | A * | 12/1998 | Camaisa et al. ............. 705/27 |
| 5,912,743 | A | 6/1999 | Kinebuchi et al. |
| 5,969,968 | A | 10/1999 | Pentel |
| 5,974,238 | A | 10/1999 | Chase, Jr. |
| 5,991,739 | A * | 11/1999 | Cupps et al. ............. 705/26.8 |
| 6,038,545 | A | 3/2000 | Mandeberg et al. |
| 6,107,944 | A | 8/2000 | Behr |
| 6,167,255 | A | 12/2000 | Kennedy, III et al. |
| 6,208,976 | B1 | 3/2001 | Kinebuchi et al. |
| 6,219,696 | B1 | 4/2001 | Wynblatt et al. |
| 6,301,564 | B1 | 10/2001 | Halverson |
| 6,341,316 | B1 | 1/2002 | Kloba et al. |
| 6,356,543 | B2 * | 3/2002 | Hall et al. ............. 370/352 |
| 6,366,650 | B1 * | 4/2002 | Rhie et al. ............. 379/88.13 |
| 6,415,138 | B2 * | 7/2002 | Sirola et al. ............. 455/90.1 |
| 6,421,717 | B1 | 7/2002 | Kloba et al. |
| 6,425,524 | B2 | 7/2002 | Pentel |
| 6,435,406 | B1 | 8/2002 | Pentel |
| 6,553,412 | B1 | 4/2003 | Kloba et al. |
| 6,594,347 | B1 * | 7/2003 | Calder et al. ............. 379/88.01 |
| 6,779,042 | B1 | 8/2004 | Kloba et al. |
| 6,839,744 | B1 | 1/2005 | Kloba et al. |
| 6,865,261 | B1 | 3/2005 | Rao et al. |
| 6,880,750 | B2 | 4/2005 | Pentel |
| 6,920,431 | B2 | 7/2005 | Showghi et al. |
| 6,973,437 | B1 | 12/2005 | Olewicz et al. |
| 7,000,032 | B2 | 2/2006 | Kloba et al. |
| 7,069,228 | B1 * | 6/2006 | Rose et al. ............. 705/5 |
| 7,234,640 | B2 | 6/2007 | Pentel |
| 2001/0047264 | A1 * | 11/2001 | Roundtree ............. 704/275 |
| 2001/0047302 | A1 | 11/2001 | Yoshinaga et al. |
| 2003/0050854 | A1 * | 3/2003 | Showghi et al. ............. 705/26 |
| 2003/0067494 | A1 | 4/2003 | Burns |
| 2003/0107588 | A1 | 6/2003 | Elsbree et al. |

FOREIGN PATENT DOCUMENTS

| | | |
|---|---|---|
| WO | WO9820434 | 5/1998 |
| WO | WO9841936 | 9/1998 |

OTHER PUBLICATIONS

Defendants Menusoft Systems Corporation and Cash Register Sales & Service of Houston, Inc.'s Original Answer, Defenses, and Counterclaims, Sep. 4, 2007, *Ameranth, Inc. v. Menusoft Systems Corporation and Cash Register Sales & Service of Houston, Inc. (dba CRS Texas)*, 2-07-CV-271, (E.D. Tex.).

Plaintiff Ameranth, Inc.'s Reply to Defendants Menusoft Systems Corporation and Cash Register Sales & Service of Houston, Inc.'s Counterclaims, Sep. 24, 2007, *Ameranth, Inc. v. Menusoft Systems Corporation and Cash Register Sales & Service of Houston, Inc. (dba CRS Texas)*, 2-07-CV-271, (E.D. Tex.).

Complaint for Declaratory Judgment of Patent Non-Infringement and Invalidity, Jul. 17, 2007, *Radiant Systems, Inc. v. Ameranth, Inc.*, 1-07-CV-1641, (N. D. Ga.).

Defendant and Counterclaim Plaintiff Ameranth, Inc.'s Answer and Counterclaims for Patent Infringement, Aug. 10, 2007, *Radiant Systems, Inc. v. Ameranth, Inc.*, 1-07-CV-1641, (N.D. Ga.).

Reply to Counterclaims, Sep. 4, 2007, *Radiant Systems, Inc. v. Ameranth, Inc.*, 1-07-CV-1641, (N.D. Ga.).

Radiant Systems, Inc.'s Motion for Leave to File a First Amended Complaint for Declaratory Judgment of Patent Non-Infringement, Invalidity and Inequitable Conduct, Oct. 5, 2007, *Radiant Systems, Inc. v. Ameranth, Inc.*, 1-07-CV-1641, (N.D. Ga.).

Radiant Systems, Inc.'s Memorandum in Support of Its Motion for Leave to File a First Amended Complaint for Declaratory Judgment of Patent Non-Infringement, Invalidity and Inequitable Conduct, Oct. 5, 2007, *Radiant Systems, Inc. v. Ameranth, Inc.*, 1-07-CV-1641, (N. D. Ga.).

Exhibit A to Radiant Systems, Inc.'s Motion for Leave to File a First Amended Complaint for Declaratory Judgment of Patent Non-Infringement, Invalidity and Inequitable Conduct—First Amended Complaint for Declaratory Judgment of Patent Non-Infringement, Invalidity and Inequitable Conduct, Oct. 5, 2007, *Radiant Systems, Inc. v. Ameranth, Inc.*, 1-07-CV-1641, (N.D. Ga.).

Exhibit B to Radiant Systems, Inc.'s Motion for Leave to File a First Amended Complaint for Declaratory Judgment of Patent Non-Infringement, Invalidity and Inequitable Conduct—FSTEC, Show Directory Oct. 1996.

Exhibit C to Radiant Systems, Inc.'s Motion for Leave to File a First Amended Complaint for Declaratory Judgment of Patent Non-Infringement, Invalidity and Inequitable Conduct—Declaration and Power of Attorney for U.S. Appl. No. 09/400,413, issued U.S. Patent No. 6,384,850, Oct. 25, 1999.

Exhibit D to Radiant Systems, Inc.'s Motion for Leave to File a First Amended Complaint for Declaratory Judgment of Patent Non-Infringement, Invalidity and Inequitable Conduct—FSTEC, Show Directory Nov. 1997.

Exhibit E to Radiant Systems, Inc.'s Motion for Leave to File a First Amended Complaint for Declaratory Judgment of Patent Non-Infringement, Invalidity and Inequitable Conduct—FSTEC, Show Directory Nov. 1998.

Exhibit F to Radiant Systems, Inc.'s Motion for Leave to File a First Amended Complaint for Declaratory Judgment of Patent Non-Infringement, Invalidity and Inequitable Conduct—Ameranth webpage, 1998.

Exhibit G to Radiant Systems, Inc.'s Motion for Leave to File a First Amended Complaint for Declaratory Judgment of Patent Non-Infringement, Invalidity and Inequitable Conduct—Office Action, Nov. 29, 2000, for U.S. Appl. No. 09/400,413, issued U.S. Patent No. 6,384,850.

Exhibit H to Radiant Systems, Inc.'s Motion for Leave to File a First Amended Complaint for Declaratory Judgment of Patent Non-Infringement, Invalidity and Inequitable Conduct—Marked-up claims of U.S. Appl. No. 09/400,413, issued U.S. Patent No. 6,384,850.

Exhibit I to Radiant Systems, Inc.'s Motion for Leave to File a First Amended Complaint for Declaratory Judgment of Patent Non-Infringement, Invalidity and Inequitable Conduct—Amendment & Response to Nov. 29, 2000 Office Action, Feb. 26, 2001, for U.S. Appl. No. 09/400,413, issued U.S. Patent No. 6,384,850.

Exhibit J to Radiant Systems, Inc.'s Motion for Leave to File a First Amended Complaint for Declaratory Judgment of Patent Non-Infringement, Invalidity and Inequitable Conduct—Notice of Allowability, Nov. 24, 2004, for U.S. Appl. No. 10/015,729, issued U.S. Patent No. 6,871,325.

Ameranth's Opposition to Radiant's Motion for Leave to File a First Amended Complaint, Oct. 22, 2007, *Radiant Systems, Inc. v. Ameranth, Inc.*, 1-07-CV-1641, (N.D. Ga.).

Exhibit 1 to Ameranth's Opposition—International Search Report, Nov. 21, 2000, for PCT/US00/25863.

Exhibit 2 to Ameranth's Opposition—International Search Report, May 17, 2005, for PCT/USO4/13206.

Exhibit 3 to Ameranth's Opposition—Written Opinion of the International Searching Authority, May 20, 2005, for PCT/US04/13206.

Exhibit 4 to Ameranth's Opposition—International Search Report, Mar. 1, 2001, for PCT/US00/31510.

Exhibit 5 to Ameranth's Opposition—International Preliminary Examination Report, Jun. 20, 2001, for PCT/US04/13206.

(56) References Cited

OTHER PUBLICATIONS

Exhibit 6 to Ameranth's Opposition—International Search Report, Jul. 4, 2003, for PCT/US03/08050.
Exhibit 7 to Ameranth's Opposition—Notice of Allowability, Mar. 18, 2005, U.S. Appl. No. 10/136,873, issued U.S. Patent No. 7,028,264.
Exhibit 8 to Ameranth's Opposition—Allowed Claims of U.S. Appl. No. 10/136,873, issued U.S. Patent No. 7,028,264.
Exhibit 9 to Ameranth's Opposition—Specification of U.S. Appl. No. 10/136,873, issued U.S. Patent No. 7,028,264.
Exhibit 10 to Ameranth's Opposition—Statement Regarding Notice of Allowance, Apr. 12, 2005, U.S. Appl. No. 10/136,873, issued U.S. Patent No. 7,028,264.
Exhibit 11 to Ameranth's Opposition—Notice of Allowability, Oct. 15, 2004, U.S. Appl. No. 10/079,739, issued U.S. Patent No. 6,857,105.
Radiant Systems, Inc.'s Reply Brief in Further Support of Its Motion for Leave to File a First Amended Complaint, Oct. 29, 2007, *Radiant Systems, Inc. v. Ameranth, Inc.*, 1-07-CV-1641, (N.D. Ga.).
Exhibit A to Radiant Systems, Inc.'s Reply Brief in Further Support of Its Motion for Leave to File a First Amended Complaint—U.S. Patent No. 5,580,214.
Hamilton, Martha M., "Computers on the Menu," Washington Business, Dec. 18, 1995.
Letter from Ronald D. Coleman, President & CEO of MarCole Interactive Systems to George L. Kanabe, Fish & Richardson P.C., Oct. 2, 2007.
MarCole Enterprises, Inc. Catalog, Tabletop Merchandising and Gift Registry System Flow, 1993.
MarCole Press Release, *MarCole Introduces New Gift Registry System Products at Retail Systems '96*, May 20, 1996.
MarCole Press Release, *MarCole Enterprises Wins ISA 's Coveted Interactive Marketing Best Multimedia Application Award*, Jul. 23, 1996.
MarCole Press Release, *MarCole's Interactive Shopping and Gift Registry System to Rollout to all Reading China & More! Stores*, Sep. 30, 1996.
MarCole Press Release, *MarCole's Interactive Shopping System to Offer NFL Team Home Products at Super Bowl XXXI*, Jan. 15, 1997.
Rubinstein, Ed, *Wish Lists, Is Gift Registry the Most Profitable Kiosk of All?*, Kiosk Business, Jan./Feb. 2002.
MarCole Draft New Release, *MarCole Enterprises Named NCR Retail Solution Partner*, Aug. 19, 1998.
Brookins, Laurie, *State of the Heart, Crafting a High-Tech Registry for the New Bride and Groom*, The Gourmet Retailer, Nov. 1999.
Tableware Today, *MarCole Gift Registry Works v.5.0*, Jun./Jul. 2002.
Kiosk, *The Gift Registry Kiosk*, 2002.
Killam, Jim, Interactive Kiosks Score In-Store, Sales and Marketing Strategies & News, Mar. 199?.
Office World News, Interactive Multimedia Systems Transform Superstore Shopping, Feb. 1996.
Jankowski, Wanda, *Electronic Kiosks: Boon for Retailers?*, Gifts & Decorative Accessories, Oct. 1995.
Hawk, Amanda Kate, Kiosks! *The Good, The Bad, and the Best*, RIS News, Sep. 1996.
Porter, Thyra, *MarCole Signs New Tabletop Manufacturers*, Kitchenware News, Mar. 1996.
Promotion Audit, *Office Depot Installs Interactive Shopping System*, Apr. 1996.
Kehoe, Ann-Margaret,*Wooing Brides with Technology*, Home Furnishings Daily, Oct. 11, 1993.
Brandweek, *Dayton Hudson Grows Kiosk Test*, Elaine Underwood, May 8, 1995.
Gift & Stationary Business, *Pull in a China Shop*, Jun. 1993.
Kehoe, Ann-Margaret, *Technology Comes to Tabletop*, Home Furnishings Daily, May 24, 1993.
"Graphic User Interface Builder Menu Construction Using a Tree-View Container" IBM Technical Disclosure Bulletin, vol. 38, No. 9, Sep. 1995.

"Entertainment Industry Leader Rich Rank Takes Helm At Cybermeals, World's Largest Online Meal Ordering System", Sep. 15, 1998, <URL:http://www.food.com/food.sph/saisp...s/aboutus/pressrelease.jsp?id=228>, printed on Apr. 20, 2001.
"W3C Putting Compact HTML, HDML to Test for Net Access—Mobile Markup Languages Face Off", Yoshiko Hara, Apr. 6, 1998, <URL:http://www.techweb.com/se/directlink.cgi?eet19980406s0089>, printed on Sep. 2, 1999.
Squirrel Systems, company information web page, http://web.archive.org/web/19990508153731/www.squirrelsystems.com/about/company.html, May 8, 1999
Squirrel Systems, products web page, web page, http://web.archive.org/web/19990508175824/www.squirrelsystems.com/products/newsq.html, May 8, 1999.
Robin Berger, "POS Positions Spago for Growth," http://web.archive.org/web/19991009105324/www.squirrelsystems.com/media/articles/spago.html, http://web.archive.org/web/19991112165756/www.squirrelsystems.com/media/articles.html, Hospitality Technology, Apr./May 1997.
Squirrel Companies Inc., System Setup Version 3.0x, Copyright 1989
Squirrel Companies Inc., Squirrel Restaurant Management System Brochure, Pre-Sep. 21, 1999??.
Squirrel Systems, "SQUiRREL® Companies Inc. wins the California Restaurant Association's 1998 Expo Innovator Award in the Technology category", http://web.archive.org/web/19991013045515/squirrelsystems.com/media/pr/aug2098.html, Aug. 20, 1998
Business Wire, Fujitsu and Sulcus Hospitality Group partner to develop first wireless computer for restaurant industry, Business Wire, Aug. 30, 1993.
Business Wire, "Sulcus's Squirrel and cybermeals Ink Technology Alliance; cybermeals New Menucaster Software to be Bundled into Squirrel's Touch Tomorrow Point of Sale Package," http://findarticles.com/p/articles/mi_m0EIN/is_1998_Feb_24/ai_20316339?tag=content;coll, Business Wire, Feb. 24, 1998.
Business Wire, "Accel Partners Invest $10 Million in cybermeals", http://www.allbusiness.com/banking-finance/financial-markets-investing/6840069-1.html, Business Wire, May 28, 1998
Revshare.com, cybermeal revenue sharing program, http://web.archive.org/web/19980124080645/http://www.revshare.com/, Jan. 24, 1998.
Squirrel Systems, SQ Classic product webpage, http://web.archive.org/web/19991010022213/www.squirrelsystems.com/products/sq_classic.html, Oct. 10, 1999.
Squirrel Systems, "Brew Moon Management Toasts SQUiRREL's 'Seamless Solution'", http://web.archive.org/web/19990508170309/www.squirrelsystems.com/media/articles/brewmoon.html, Nov. 1998.
Squirrel Systems, "Squirrel Customer Profile: Chevy'S Fresh Mex", http://www.squirrelsystems.com/news/articles/9808.html, Aug. 1998
Micros Systems, Inc., "8700 HMS Version 2.10 User's Manual", http://web.archive.org/web/19961111034156/www.micros.com/frames/servdine.htm, Copyright 1997.
Micros Systems, Inc., core products web page, http://web.archive.org/web/19961111034156/www.micros.com/frames/servdine.htm, Nov. 11, 1996.
Micros Systems, Inc., new products web page, http://web.archive.org/web/1996111103410/www.micros.com/frames/innovats.htm, Nov. 11, 1996.
Micros Systems, Inc., quick service products web page, http://web.archive.org/web/19961111034149/www.micros.com/frames/quikserv.htm, Nov. 11, 1996.
Micros Systems, Inc., company information web page, http://web.archive.org/web/19961111034029/www.micros.com/frames/about.htm, Nov. 11, 1996.
Micros Systems, Inc., 8700 HMS Product Overview, http://web.archive.org/web/19990508144340/www.micros.com/mktg/html/8700over.htm, May 8, 1999.
Micros Hospitality Information Systems, "Preliminary Information Packet for the: Micros Hand-Held Touchscreen," Pre-Sep. 21, 1999??.

(56) References Cited

OTHER PUBLICATIONS

Micros Systems, Inc., "The Micros 2700 HTS Touchscreen", Pre Sep. 21, 1999??.
Integrated Restaurant Software, RMS Touch—Touch Screen Restaurant Management System product description, http://web.archive.org/web/19970215025823/www.rmstouch.com/pos.htm, Feb. 15, 1997.
Integrated Restaurant Software, company profile web page, http://web.archive.org/web/19970215025858/www.rmstouch.com/profile.htm, Feb. 15, 1997.
Compuwave Technologies, Inc., Elite32 Palm System brochure, Pre-Sep. 21, 1999??.
Compuwave Technologies, Inc., POSInfrared Restaurant System brochure, Pre-Sep. 21, 1999??.
Compuwave Technologies, Inc., Wireless POS Drive-Thru System brochure, Pre-Sep. 21, 1999??.
Compuwave Technologies, Inc., "Compuwave Technologies Approved as Supplier to McDonald's Canada", Compuwave Press Release, Sep. 14, 2000.
Compuwave Technologies, Inc., Revolutionary Wireless Restaurant System brochure, Pre-Sep. 21, 1999??.
Menusoft Systems Corporation, "Winning with Windows Digital Dining: Austin 97", Austin, Texas Digital Dining Users' Conference, Feb. 20, 1997.
Menusoft Systems Corporation, "Digital Dining for Windows User Manual", Copyright 1997.
Menusoft Systems Corporation, "Digital Dining for Windows v7.0 User Manual", Copyright 1997.
Menusoft Systems Corporation, "Digital Dining for Windows v7.0 setup manual", Copyright 1997.
Micros Systems, Inc., "POS Configuration User's Guide: 3700 POS", Copyright 1998.
Ibertech, Inc., "Ibertech, cybermeals Announce Technology Partnership", http://findarticles.com/p/articles/mi_m0EIN/is_1998Feb_2/ai_20205914/print?tag=artBody;coll, Business Wire. Feb. 2, 1998.
Ed Rubenstein, "Future Food for Thought", http://findarticles.com/p/articles/mi_m3190/is_/ai_20462276, Nation's Restaurant News, Mar. 30, 1998.
Ameranth Technology Systems, Inc., company home page, http://web.archive.org/web/19981202001436/http://www.ameranth.com/, Dec. 2, 1998.
Compuwave Technologies, Inc., company information web page, http://web.archive.org/web/20010207174316/www.compuwave.net/about.htm. Feb. 7, 2001.
Collins & Malik, "Hospitality Information Technology", pp. 214-376, Kendall/Hunt Pub. Co., 3d Ed., 1998.
Hospitality Technology, pp. 14,26,34, Jan. 1997.
"Wireless Technologies and the National Information Infrastructure", OTA-ITC-622 GPO stock #052-003-01421-1, pp. 99-131, Sep. 1995.
Integrated Restaurant Software, "Dining Out: Baltimore—D.C." video, Nov. 4, 1994.
CompuWave Media Publication in Taiwan, Pre-Sep. 21, 19??.
Judgment on Jury Vercict, Sep. 21, 2010. Ameranth, Inc. v. Menusoft Systems Corp. and Cash Register Sales & Service of Houston, Inc., Case No. 2:07-Cv-271-CE (E.D. Tex).
Plaintiff's Final Trial Exhibit List, Ameranth, Inc. v. Menusoft Systems Corp. and Cash Register Sales & Service of Houston, Inc., Case No. 2:07-CV-271-CE (E.D. Tex.).
Defendants' Final Trial Exhibit List, Amaranth, Inc. v. Menusoft Systems Corp. and Cash Register Sales & Service of Houston, Inc., Case No: 2:07-CV-271-CE (E.D. Tex.).

\* cited by examiner

FIG.7

This is an example of the ordering "Literal Screen".

INFORMATION MANAGEMENT AND SYNCHRONOUS COMMUNICATIONS SYSTEM

The present application is a continuation-in-part of application Ser. No. 11/112,990, filed Apr. 22, 2005 now U.S. Pat. No. 8,146,077, which is a continuation of application Ser. No. 10/016,517, filed Nov. 1, 2001 now U.S. Pat. No. 6,982,733, which is a continuation-in-part of application Ser. No. 09/400,413, filed Sep. 21, 1999 (now U.S. Pat. No. 6,384,850). The contents of application Ser. No. 11/112,990, application Ser. No. 10/016,517, and application Ser. No. 09/400,413 are incorporated herein by reference.

FIELD OF THE INVENTION

This invention relates to an information management and synchronous communications system and method for generation of computerized menus for restaurants and other applications with specialized display and synchronous communications requirements related to, for example, the use of equipment or software with non-PC-standard graphical formats, display sizes and/or applications for use in remote data entry, information management and synchronous communication between host computer, digital input device or remote pager via standard hardwired connection, the internet, a wireless link, smart phone or the like.

BACKGROUND OF THE INVENTION

While computers have dramatically altered many aspects of modern life, pen and paper have prevailed in the hospitality industry, e.g., for restaurant ordering, reservations and wait-list management, because of their simplicity, ease of training and operational speed. For example, ordering prepared foods has historically been done verbally, either directly to a waiter or over the telephone, whereupon the placed order is recorded on paper by the recipient or instantly filled.

Although not previously adapted for wide-scale use in the hospitality industry, various forms of digital wireless communication devices are in common use, e.g., digital wireless messengers and pagers. Also in common use are portable laptop and handheld devices. However, user-friendly information management and communication capability not requiring extensive computer expertise has not heretofore been available for use in everyday life such as for restaurant ordering, reservations and wait-list management. Hundreds of millions of dollars have been spent on personal digital assistant ("PDA") development seeking to produce a small, light-weight and inexpensive device that could be adapted to such uses; yet none have yielded a satisfactory solution.

One of the inherent shortcomings of PDA type devices is that, as they strive for small size, low weight and low cost, they must compromise the size and clarity of the operator display medium interface itself, which in most cases is one of a variety of LCD (liquid crystal display) type devices. As the size of the display shrinks, the amount of information that may be displayed at any one point or time is commensurately decreased, typically requiring multiple screens and displays to display information to the operator. This reduces the overall utility of the device. Additionally, the smaller display and keyboard results in a non-optimal operator interface, which slows down operation and is thus unacceptable for the time criticality of ordering, reservation and wait-list management and other similar applications. This necessitates many design compromises which in the aggregate have resulted in limited acceptance of PDA type devices in the restaurant and hospitality fields.

Many of the negatives prevalent in earlier devices have been eliminated, but, to date, there is still no integrated solution to the ordering/waitlist/reservation problem discussed above. With the advent of the Palm® and other handheld wireless devices, however, the efforts to make such devices ubiquitous have begun to bear fruit at least in some areas, e.g., personal calendars. However, substantial use of such devices in the restaurant and hospitality context has not occurred to date. As discussed above, at least one of the reasons PDAs have not been quickly assimilated into the restaurant and hospitality industries is that their small display sizes are not readily amenable to display of menus as they are commonly printed on paper or displayed on, e.g., large, color desktop computer screens. Another reason is that software for fully realizing the potential for wireless handheld computing devices has not previously been available. Such features would include fast and automatic synchronization between a central database and multiple handheld devices, synchronization and communication between a World Wide Web ("Web") server and multiple handheld devices, a well-defined application program interface ("API") that enables third parties such as point of sale ("POS") companies, affinity program companies and internet content providers to fully integrate with computerized hospitality applications, real-time communication over the internet with direct connections or regular modem dialup connections and support for batch processing that can be done periodically throughout the day to keep multiple sites in synch with the central database. A single point of entry for all hospitality applications to communicate with one another wirelessly has also previously been unavailable. Such a single point of entry would work to keep all wireless handheld devices and linked Web sites in synch with the backoffice server (central database) so that the different components are in equilibrium at any given time and an overall consistency is achieved. For example, a reservation made online would be automatically communicated to the backoffice server and then synchronized with all the wireless handheld devices wirelessly. Similarly, changes made on any of the wireless handheld devices would be reflected instantaneously on the backoffice server, Web pages and the other handheld devices.

For the foregoing reasons, paper-based ordering, waitlist and reservations management have persisted in the face of widespread computerization in practically all areas of commerce. At most, computerization of these functions has been largely limited to fixed computer solutions, i.e., desktop or mainframe, because of the problems heretofore faced in configuring wireless handheld devices and maintaining database synchronization for such applications. Specifically, the unavailability of any simple technique for creating restaurant menus and the like for use in a limited display area wireless handheld device or that is compatible with ordering over the internet has prevented widespread adoption of computerization in the hospitality industry. Without a viable solution for this problem, organizations have not made the efforts or investments to establish automated interfaces to handheld and Web site menus and ordering options.

A principal object of the present invention is to provide an improved information management and synchronous communications system and method which facilitates user-friendly and efficient generation of computerized menus for restaurants and other applications that utilize equipment with non-PC-standard graphical formats, display sizes and/or applications.

A further object of the present invention is to provide an improved information management and synchronous communications system and method which provides for entry, management and communication of information from the operator as well as to and from another computer, Web page menu, remote digital device using a standard hardwired connection, the internet or a wireless link.

A further object of the present invention is to provide an improved information management and synchronous communications system which is small, affordable and lightweight yet incorporates a user-friendly operator interface and displays menus in a readily comprehensible format.

A further object of the present invention is to provide a synchronous information management and communications system which enables automatic updating of both wireless and internet menu systems when a new menu item is added, modified or deleted from any element of the system.

SUMMARY OF THE INVENTION

The foregoing and other objects of the present invention are provided by a synchronous information management and communications system and method optimized for simplicity of operation which incorporates menu generation for creation of menus to be used with wireless remote handheld computer and PDA devices, the internet or any application where simple and efficient generation of menus is appropriate. The menu generation approach of the present invention includes a desktop software application that enables the rapid creation and building of a menu and provides a means to instantly download the menu configuration onto, e.g., a handheld device or Web page and to seamlessly interface with standard point of sale ("POS") systems to enable automatic database updates and communication exchanges when a change or input occurs in any of the other system elements. To solve the above and other related problems, an information management and communications system is provided which results in a dramatic reduction in the amount of time, and hence cost, to generate and maintain computerized menus for, e.g., restaurants and other related applications that utilize non-PC-standard graphical formats, display sizes or applications.

The menu generation approach of the present invention has many advantages over previous approaches in solving the problem of converting paper-based menus or Windows® PC-based menu screens to small PDA-sized displays and Web pages. In one embodiment, the present invention is a software tool for building a menu, optimizing the process of how the menu can be downloaded to either a handheld device or Web page, and making manual or automatic modifications to the menu after initial creation.

Manual modifications to the generated menus include handwritten screen captures and/or voice recorded message captures coupled with the standard menus and modifiers generated according to standard choices. Such manual modifications enable an extremely rapid and intuitive interface to enhance operations and further optimize the overall operator interface. This approach solves a long-standing, operational issue in restaurant/hotel/casino food/drink ordering when customers want something unusual and not anticipated and available through normal computerized selections. As seen in FIG. 8, the operator screen on the hand-held can capture handwritten information specific to a customers requests directly on the touch-sensitive screen of the wireless computing device. This additional information can then be coupled with the fixed menu and modifier information generated automatically from the hospitality application software and the combined message can be sent to a restaurant point of sale (POS) system, printer or/or display system. This unique operator interface enables universal languages and an unlimited set of information to be manually communicated and exchanged. The resultant combined message of one or more fixed indications selected from a menu of a device such as a hand-held, and dynamic handwritten messages and/or data provides an even more powerful tool than either modality used independently.

For example a restaurant server taking a drink order could select from a menu of her hand-held device's screen "Iced Tea", and then manually write in the literal screen of her hand-held "with lemon" as shown in FIG. 8. The manually-written information could, for example, be printed or displayed in front of a bartender preparing the drink order. The indication "Iced Tea" as selected from a menu of the hand-held would also be presented to the bartender, perhaps by printing and/or screen display. The server can also select any printer from within the hospitality establishment directly from the operator interface on the screen of the hand-held and have either the order or the receipt printed out where it is most convenient and efficient.

Similarly, a server taking a drink order could select from a menu of her hand-held device's screen "Iced Tea", and then record the voice message "with lemon" using her hand-held device integral microphone. The recorded information could, for example, be played on a speaker attached to a computer, POS system, or the like located near the bartender or chef preparing the order. The indication "Iced Tea" as selected from a menu of the hand-held would also be presented to the bartender/chef, perhaps by printing and/or screen display. Both the literal screen capture method and the voice recorded message method combine the power of automatic fixed menu generation with the expanded flexibility to resolve operational issues that exist throughout the hospitality market without this innovative solution. Additionally, in certain embodiments, hand-writing and voice recognition technologies can be utilized to convert the manual operator inputs into appropriate text messages which can be combined with the computer generated menu options to convey the combined information to, for example, a bartender or chef.

Similarly, hand-held devices can link the above innovations to individual customers at specific tables through a graphical user interface on the hand-held screen that assigns each customer a number within a table. For example, table 20 might have 6 customers (1-6) and each customer has a different order, By enabling the linkage of the orders to specific customer positions within the table and accessible from the hand-held screen, the servers can easily track and link the specific orders to the specific customers.

The use of wireless handheld devices in the restaurant and hospitality industry is becoming increasingly pervasive as restaurant owners and managers become more aware of the benefits. With the proper wireless handheld system in place, restaurants can experience increased table turns from improved server productivity and shorter order taking and check paying times. Restaurants and POS companies seeking to provide a wireless handheld interface to their desktop-based POS systems or a Web page equivalent face several challenges. These challenges include building a menu using their existing database and transferring the menu onto handheld devices or Web pages that will interface with servers wirelessly or to restaurants/customers over the internet. The menu generation approach of the present invention is the first coherent solution available to accomplish these objectives easily and allows one development effort to produce both the handheld and Web page formats, link them with the existing POS systems, and thus provides a way to turn a complicated, time-consuming task into a simple process.

The information management and synchronous communications system of the present invention features include fast synchronization between a central database and multiple handheld devices, synchronization and communication between a Web server and multiple handheld devices, a well-defined API that enables third parties such as POS companies, affinity program companies and internet content providers to fully integrate with computerized hospitality applications, real-time communication over the internet with direct connections or regular modem dialup connections and support for batch processing that can be done periodically throughout the day to keep multiple sites in synch with the central database.

The communication module also provides a single point of entry for all hospitality applications, e.g., reservations, frequent customer ticketing, wait lists, etc. to communicate with one another wirelessly and over the Web. This communication module is a layer that sits on top of any communication protocol and acts as an interface between hospitality applications and the communication protocol and can be easily updated to work with a new communication protocol without modifying the core hospitality applications. An exemplary system diagram of such a communications systemic relationship is shown in FIG. 9 and serves as an example of the power of the synchronization element of the invention through a common, linked solution. A single point of entry works to keep all wireless handheld devices and linked web sites in synch with the backoffice server applications so that the different components are in equilibrium at any given time and an overall consistency is achieved. For example, a reservation made online can be automatically communicated to the backoffice server and then synchronized with all the wireless handheld devices wirelessly. Similarly, changes made on any of the wireless handheld devices are reflected instantaneously on the backoffice server Web pages and the other handheld devices.

BRIEF DESCRIPTION OF THE DRAWINGS

The foregoing features and advantages of the present invention can be appreciated more fully from the following description, with references to the accompanying drawings in which:

FIG. 7 is a schematic representation of a point of sale interface on a wireless handheld device for use in displaying page menus created in conformity with a preferred embodiment of the present invention.

DETAILED DESCRIPTION OF THE INVENTION

Figure 1:
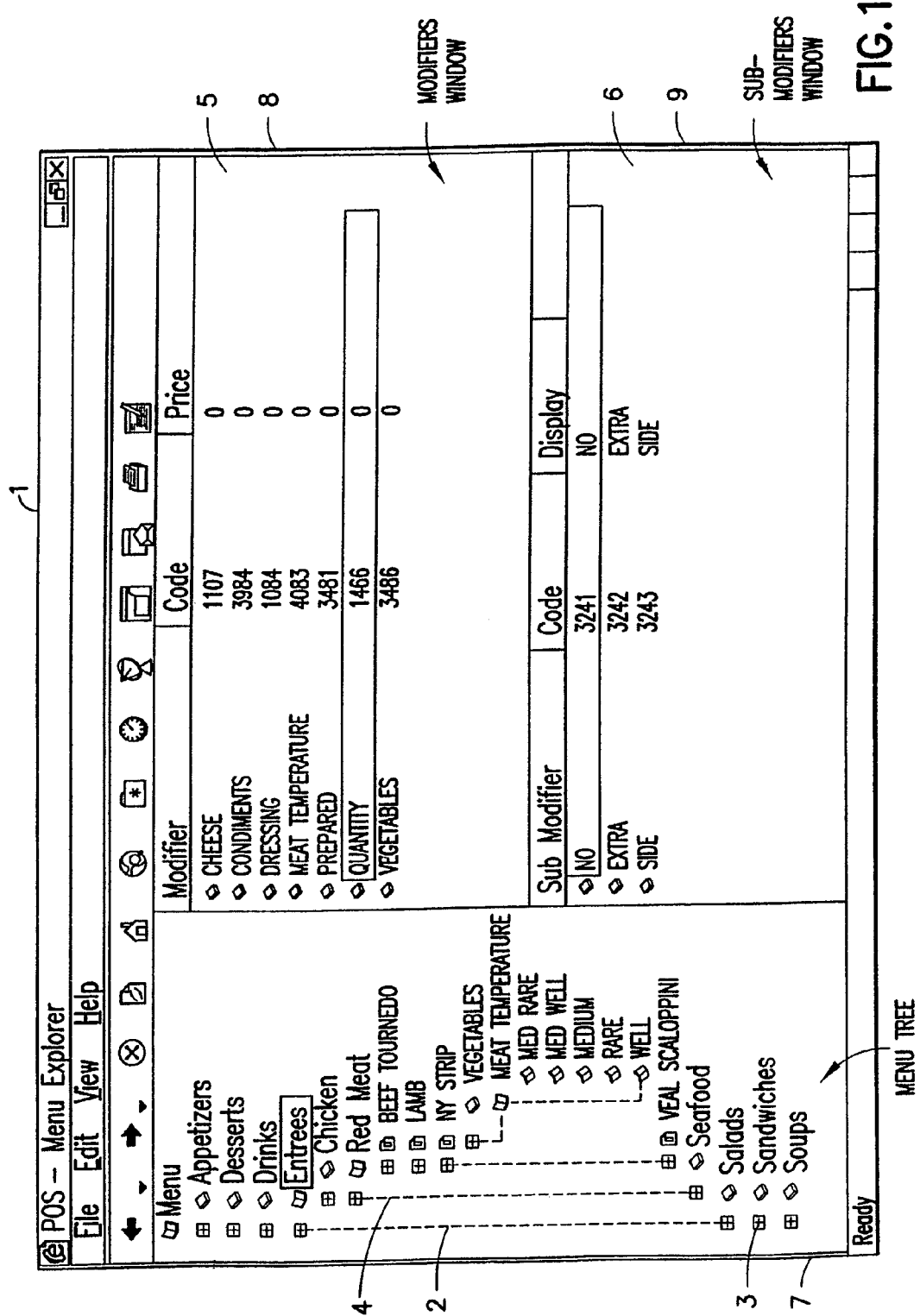
FIG. 1 is a schematic representation of a window displayed on a computer display screen which shows a hierarchical tree menu, modifier window and sub-modifier window in conformity with a preferred embodiment of the present invention.

Most personal computers today run under an operating system that provides a graphical user interface ("GUI") for accessing user applications. A GUI is used in the preferred embodiment of the present invention. Through an interface of windows, pull-down menus, and toolbars, GUI operating systems have simplified PCs and have rendered computer technology more user friendly by eliminating the need to memorize keyboard entry sequences. In addition, GUIs allow users to manipulate their data as they would physical entities. For example, a window can represent a file and the contents of the window can represent the records of the file. The window can be opened, closed, or set aside on a desktop as if it were an actual object. The records of the file can be created, deleted, modified and arranged in a drag-and-drop fashion as if they also were physical objects. The most common GUI operating systems that provide this "object-oriented" environment for personal computers are Microsoft Windows® systems, including Windows CE® for handheld wireless devices and the like. Generally, a particular application program presents information to a user through a window of a GUI by drawing images, graphics or text within the window region. The user, in turn, communicates with the application by "pointing" at graphical objects in the window with a pointer that is controlled by a hand-operated pointing device, such as a mouse, or by pressing keys on a keyboard.

The use of menus is conventional in GUIs for software applications. Menus are typically utilized to provide end users of applications with available choices or processing options while using the applications. For example, in a typical desktop or interactive application, selection of a "file" from a menu bar may cause display of a context menu which provides "file" options. File options can have additional subordinate or child options associated with them. If a file option having subordinate options is selected, the child options are displayed in context in a child menu or submenu proximate to the selected parent option. One or more of the child options provided in the child menu may have further subordinate options. Thus, such a menu system comprises cascading sets of menus which are displayable in context to show the parent/child relationships between options of the context menu. A menu system of this type is incorporated into the preferred embodiment of the invention.

The preferred embodiment of the present invention uses typical hardware elements in the form of a computer workstation, operating system and application software elements which configure the hardware elements for operation in accordance with the present invention. A typical workstation platform includes hardware such as a central processing unit ("CPU"), e.g., a Pentium® microprocessor, RAM, ROM, hard drive storage in which are stored various system and application programs and data used within the workstation, modem, display screen, keyboard, mouse and optional removable storage devices such as floppy drive or a CD ROM drive. The workstation hardware is configured by software including an operating system, e.g., Windows® 95, 98, NT or CE, networking software (including internet browsing software) and application software components. The preferred embodiment also encompasses a typical file server platform including hardware such as a CPU, e.g., Pentium® microprocessor, RAM, ROM, hard drive, modem, and optional removable storage devices, e.g., floppy or CD ROM drive. The server hardware is configured by software including an operating system, e.g., Windows® 95, 98, NT or CE, networking software (including Web server software) and database software.

A computer workstation for use in the preferred embodiment also includes a GUI. As is conventional, the GUI is configured to present a graphical display on the display screen arranged to resemble a single desktop. Execution of an application program involves one or more user interface objects represented by windows and icons. Typically, there may be several windows and icons simultaneously present on the desktop and displaying information that is generated by different applications.

The window environment is generally part of the operating system software that includes a collection of utility programs for controlling the operation of the computer system. The computer system, in turn, interacts with application programs to provide higher level functionality, including a direct interface with the user. Specifically, the application programs make use of operating system functions by issuing task commands to the operating system which then performs the requested task. For example, an application program may request that the operating system display certain information on a window for presentation to the user.

An aspect of the preferred embodiment of the information management and communications system of the invention is shown in FIG. 1. FIG. 1 shows an example of the GUI provided by the operating system of the preferred embodiment of the present invention. With reference to FIG. 1, the preferred embodiment includes an intuitive GUI 1 from which to build a menu on a desktop or other computer. A hierarchical tree structure 2 is used to show the different relationships between the menu categories 3 (e.g., soups, salads, appetizers, entrees, deserts, etc.), menu items 4 (e.g., green salad, chicken caesar salad, etc.), menu modifiers 5 (e.g., dressing, meat temperature, condiments, etc.) and menu sub-modifiers 6 (e.g., Italian, French, ranch, bleu cheese, etc.).

The procedure followed in configuring a menu on the desktop PC and then downloading the menu configuration onto the POS interface on the handheld device in conformance with the preferred embodiment is as follows.

The menu configuration application is launched by clicking on the appropriate icon on the desktop display screen. FIG. 1 will then be displayed. There are three windows on the screen shown in FIG. 1. The left window is the menu tree 7, also called the tree view. The top right window is the Modifiers window 8 and the bottom right window is the Sub-Modifiers window 9. The Sub-Modifiers window lists the sub-modifiers that correspond to the modifier that is selected. The views on the right are referred to as list views. There are several ways of invoking a command, including using the menu options; using the context menu (right mouse click); using the keyboard or using the toolbar icons. For example, if it is desired to add a category to the menu, the following four options are available: (1) clicking on Edit, Add Category; (2) right mouse clicking on Menu, then clicking on Add Category; (3) highlighting Menu, then typing Ctrl+T or (4) clicking on the Add Category icon on the toolbar. To add an item to a category, the following options are available: (1) highlighting the category to which it is desired to add an item and then clicking on Edit>Add Item; (2) right mouse clicking on the desired category and then clicking on Add Item; (3) highlighting the desired category, then typing Ctrl+N or (4) clicking on the Add icon on the toolbar.

When building a menu, it should be kept in mind that the menu items are stored using a tree metaphor similar to how files are stored on a PC with folders and subfolders. The menu structure is similar to the Windows® File Explorer in the way the items are organized hierarchically. Below is an example of how an item may be configured:

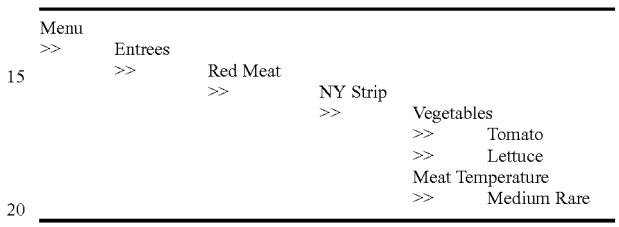

In the above example, Menu is the root. Entrees is a menu category. Red Meat is an Entree category. NY Strip is a modifier. Vegetable is a modifier. Meat Temperature is a modifier. Medium Rare is a sub-modifier of Meat Temperature.

The steps taken in building a menu are as follows:
1. Add Modifiers;
2. Add Sub-Modifiers and link them to the Modifiers;
3. Create Menu categories;
4. Add menu items to the categories;
5. Assign Modifiers to the menu items;
6. Preview the menu on the POS emulator on the desktop PC;
7. Download the menu database to the handheld device.

Figure 2:
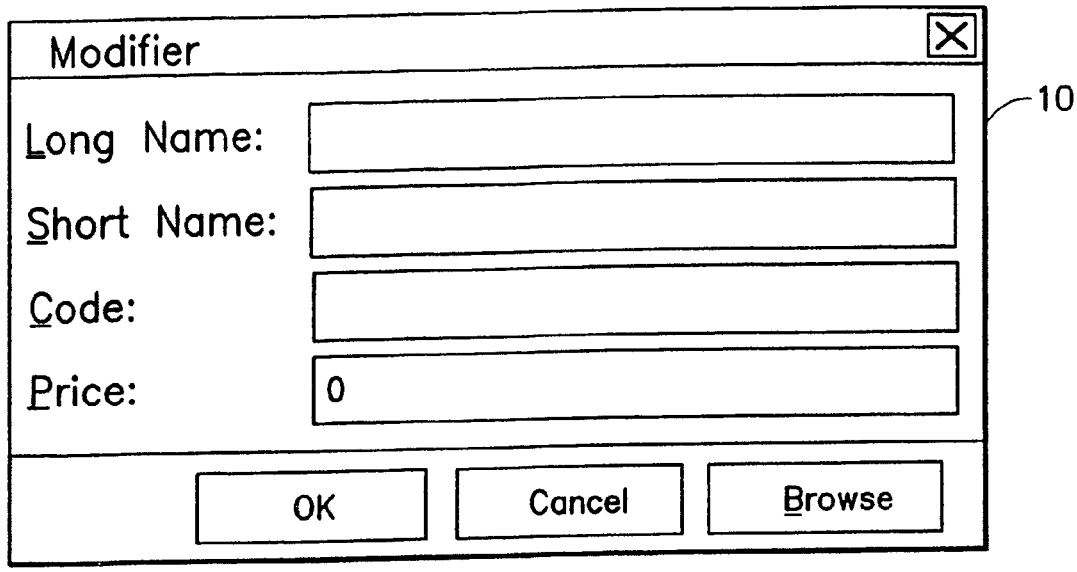
FIG. 2 is a schematic representation of a modifier dialog box in conformity with a preferred embodiment of the present invention.

To add modifiers, a user clicks on the inside of the Modifiers window, then (1) clicks on Edit>Add Modifier; (2) Presses Ctrl+N; (3) right mouse clicks in the Modifiers window, then clicks on Add Modifiers or (4) clicks on the Add icon from the toolbar. If a menu is being built from scratch, the procedure is to enter the Long Name, Short Name, Code and Price in the Modifier dialog box 10 shown in FIG. 2. The Long Name is the full descriptive name of the item. The Short Name is the abbreviated name that will be displayed on the handheld device. The Code is the numeric or alphanumeric code for the item. If there is an existing database, the existing database can be browsed and menu items retrieved from the database. Clicking on the Browse button will bring up the existing database of menu items. The item to be added is then selected and "OK" is clicked. The fields will then be filled with the information from the database. Clicking on OK again will add the item as a modifier. To delete a modifier, the modifier is selected and the Delete key pressed on the keyboard. To edit a modifier, either the modifier is double clicked or the Enter key is pressed.

Sub-modifiers represent the last level of modifiers that can be assigned to a menu tree. To add sub-modifiers, the modifier to which sub-modifiers are to be assigned is selected. Then, the focus is set on the sub-modifier window by clicking inside the Sub-Modifier window as follows: (1) clicking on Edit>Add Sub-Modifier; (2) pressing Ctrl+N; (3) right mouse clicking in the Sub-Modifiers window, then clicking on Add Sub-Modifiers or (4) clicking on the Add icon from the toolbar. If a menu is being built from scratch, the procedure is to enter the Long Name, Short Name, Code and Price in a Sub-Modifier dialog box similar to the Modifier dialog box shown in FIG. 2. As with modifiers, the Long Name is the full descriptive name of the item. The Short Name is the abbreviated name that will be displayed on the handheld device. The Code is the numeric or alphanumeric code for the item. As before, if there is an existing database, the existing database can be browsed and menu items retrieved from the database. Clicking on the Browse button will bring up the existing database of menu items. The item to be added is then selected and OK clicked. The fields will then be filled with the information from the database. Clicking on OK again will add the item as a sub-modifier. To delete a sub-modifier, the sub-modifier is selected and the Delete key depressed on the keyboard. To edit a sub-modifier, either the sub-modifier is double clicked or the Enter key is pressed.

Figure 3:
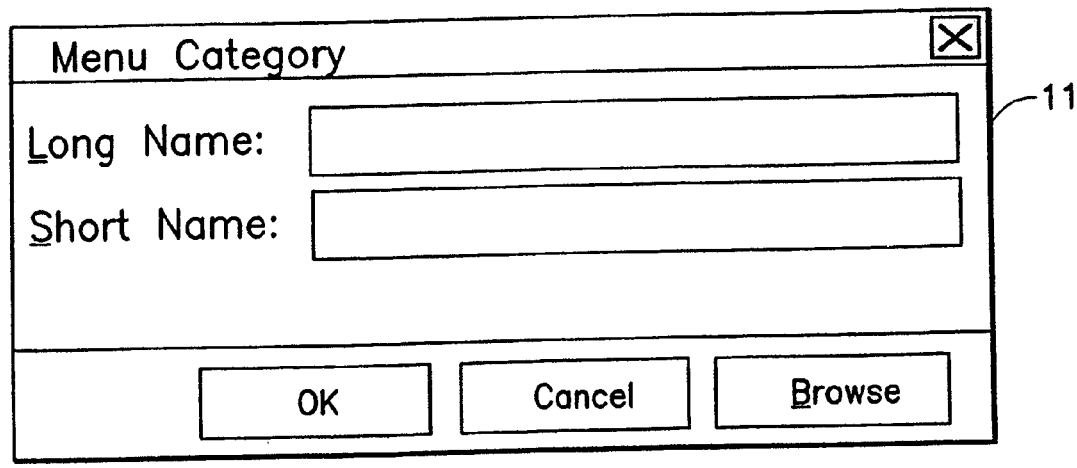
FIG. 3 is a schematic representation of a menu category dialog box in conformity with a preferred embodiment of the present invention.

Menu categories are created from the root. Some examples of categories are Appetizers, Soups, Salads, Entrees, Desserts, etc. The first step is to click on Menu in the menu tree window. Categories are added by (1) clicking on the Add Category icon from the toolbar; (2) clicking on Edit>Add Category or (3) pressing Ctrl+T. As shown in FIG. 3, Menu Category dialog box 11 then appears in which to enter the Long and Short names for the menu category.

Figure 4:
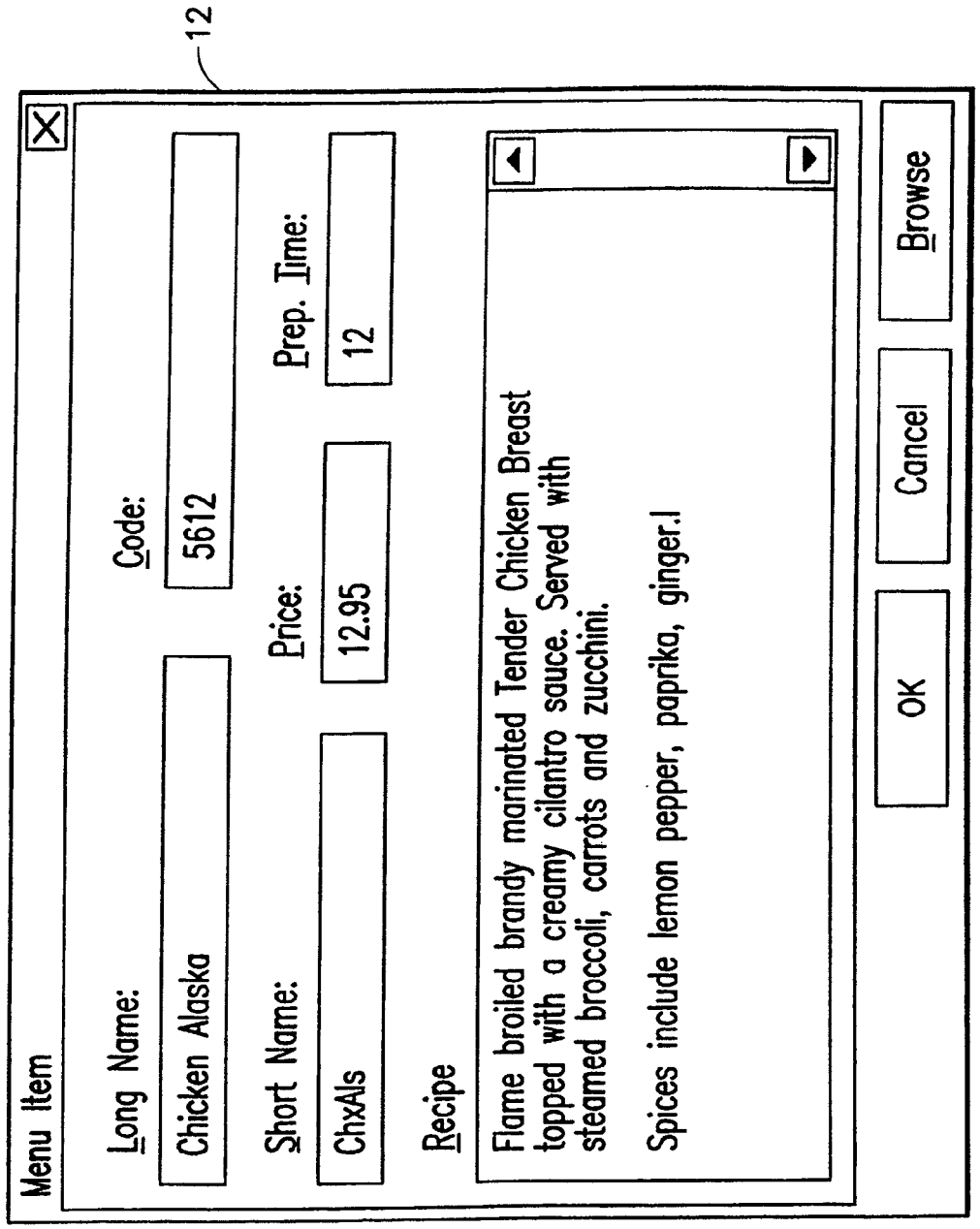
FIG. 4 is a schematic representation of a menu item dialog box in conformity with a preferred embodiment of the present invention.

To add menu items to categories, the menu category which is being built is clicked. For example, if items are being added to Appetizers, the Appetizers branch is clicked on. Then the Edit>Add Item is clicked on or Ctrl+N pressed. As before, if a menu is being built from scratch, the procedure is to enter the Long Name, Short Name, Code, Prep Time, Recipe and Price into the Menu Item dialog box 12 shown in FIG. 4. The Long Name is the full descriptive name of the item. The Short Name is the abbreviated name that will be displayed on the handheld device. The Code is the numeric or alphanumeric code for the item. Prep Time is the time it takes to prepare the meal and Recipe would include preparation methods and ingredients that are used in the preparation of the item. If there is an existing database, the existing database can be browsed and menu items retrieved from the database. Clicking on the Browse button will bring up the existing database of menu items. The item to be added is then selected and OK is clicked. The fields will then be filled with the information from the database. Clicking on OK again will add the item to the category.

Once the menu items have been entered, it may be desired to assign some modifiers to the menu items. For example, it may be desired to assign meat temperature to a steak order. To accomplish this, first the modifier to be assigned is selected, then the menu item on the tree view that is to be assigned the modifier is clicked on and then Edit>Assign Modifier is clicked on. Or, the modifier can simply be dragged and dropped onto the menu item to link them. A dialog box is then displayed asking if this modifier is a required modifier. If it is a required modifier, the display icon will be red but if it is a non-required modifier the display icon will be green. As many modifiers as are applicable can be assigned. If any changes are made to the modifiers, those changes will be automatically reflected throughout the menu tree.

Once the modifiers have been entered, it may be desired to assign sub-modifiers to the modifiers items. For example, it may be desired to add Honey Mustard as a sub-modifier to Dressing. To accomplish this, first the modifier to be assigned a sub-modifier is selected, then the sub-modifier window is clicked on, then Edit>Add Sub Modifier is clicked on, Ctrl+N entered or the Add icon from the toolbar is clicked on. Or, the sub-modifier can simply be dragged and dropped onto the modifier to link them.

When the menu has been completely configured, it can be previewed on a POS emulator on the desktop to verify that the menu is correctly configured before downloading it to the handheld device. To preview, File>Preview Database is clicked on or the Preview Database icon from the toolbar is clicked on. The handheld POS emulator on the desktop can then be run. If the configuration is deemed acceptable, the handheld device is connected to the desktop PC to ensure that a connection has been established; the POS application on the handheld device is exited and File>Download Database is clicked on or the Download Database icon from the toolbar is clicked on. If there is an existing menu database on the handheld device, the system will ask if the existing database should be replaced. Yes is clicked if existing database replacement is desired.

A database function enables the creation of, e.g., a breakfast menu, lunch menu and dinner menu and downloading them to a handheld device. Functions available are (1) creating a new database; (2) opening an existing database; (3) saving a database under a different name. To access these functions, File is clicked on the menu bar.

Figure 5:
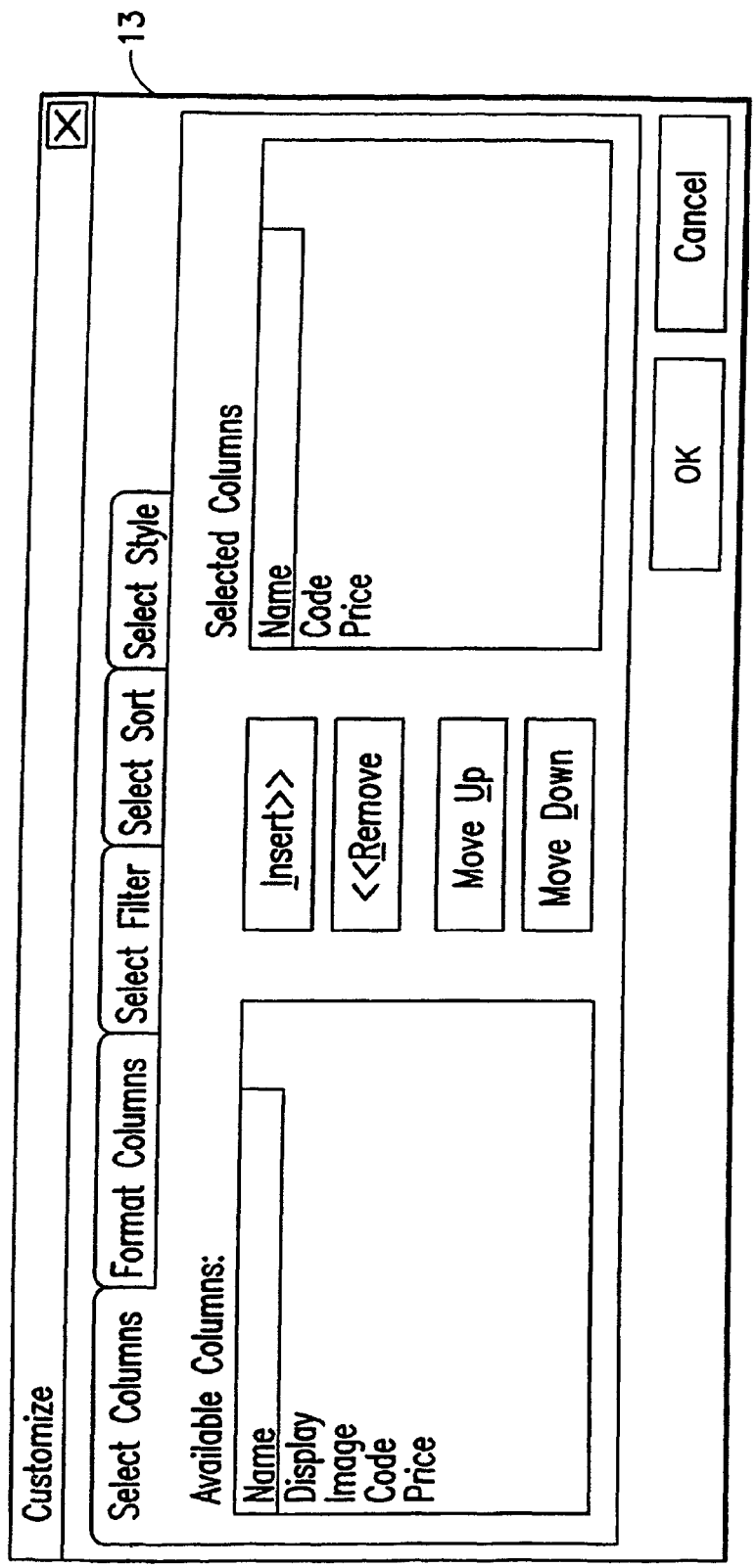
FIG. 5 is a schematic representation of a display customization dialog box in conformity with a preferred embodiment of the present invention.

The preferred embodiment encompasses customized layout, views and fonts. To set the focus on the view it is desired to change, click inside the desired window. The main customizing dialog box is accessed by clicking on View>Customize View. A dialog box 13, as shown in FIG. 5, will be displayed including tabs that allow the following options: selection of Columns to display in the list view by choosing and arranging the fields to display in the Modifiers and Sub-Modifiers windows; formatting Columns by specifying the column widths and justification; selecting Filter allows restricting the list to display only the items that meet certain criteria. For example, display of modifiers with codes between 500 and 550. Selecting Sort allows sorting the modifiers or sub-modifiers according to any of the available fields such as Name, Code or Price. Selecting Style facilitates choice of font type, style, size, etc. To change the font in a particular window, click on View>Fonts or right mouse click in the desired window and then click on Fonts. To change the size of the windows, drag the borders of the windows to expand or contract the size of the windows. To change the column widths, simply drag the edge of the column headers to increase or decrease the column widths.

Figure 6:
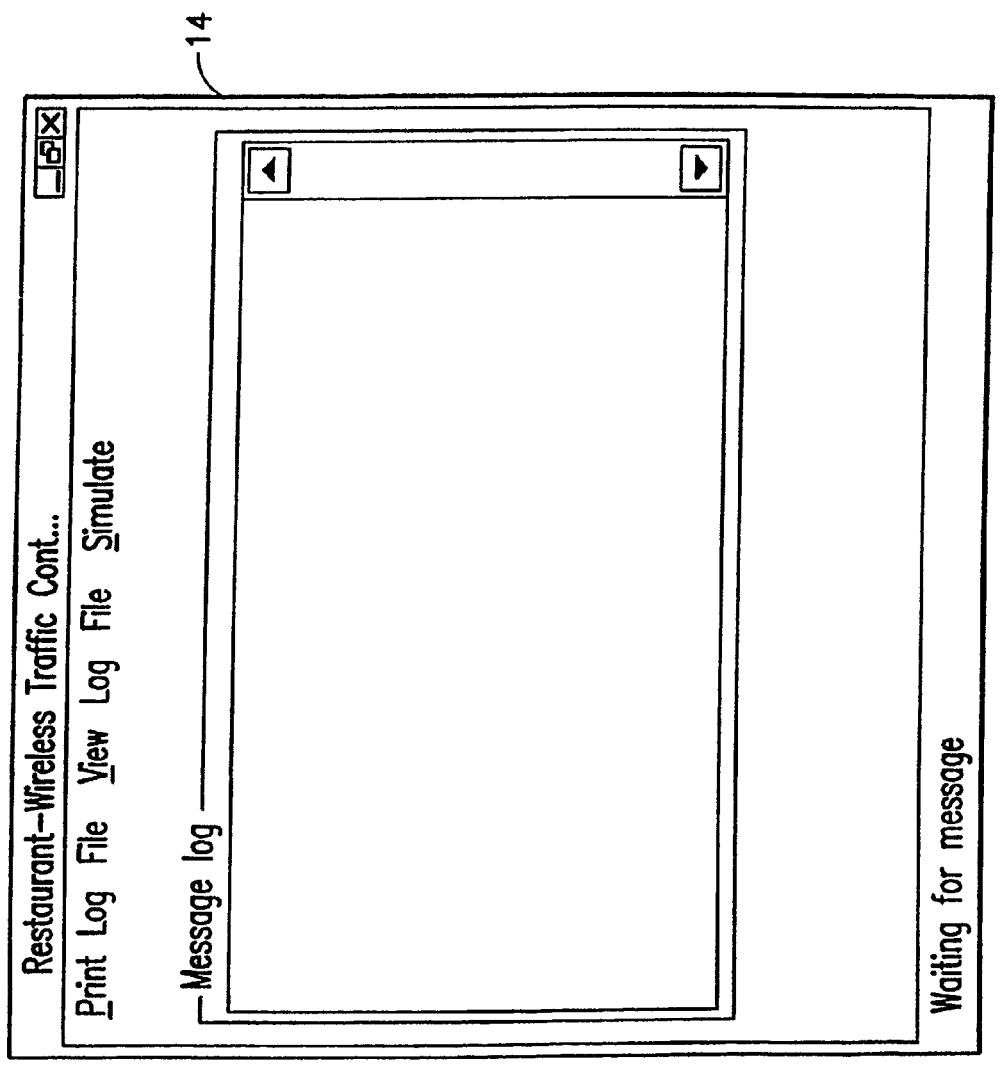
FIG. 6 is a schematic representation of a communications control window in conformity with a preferred embodiment of the present invention.
Figure 8:
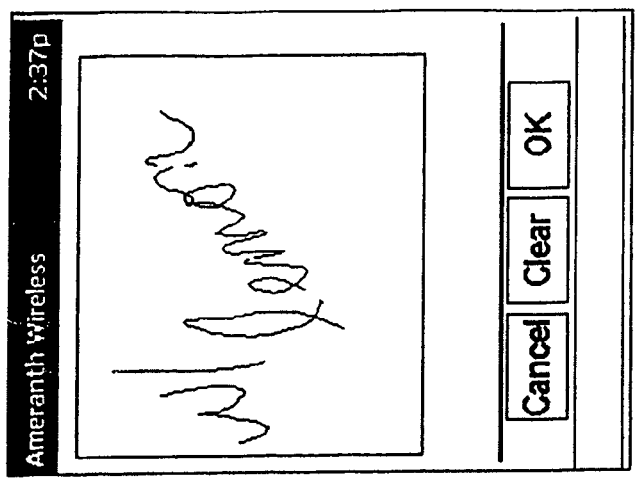
FIG. 8 is an example of a literal, hand-written screen according to embodiments of the present invention.
Figure 9:
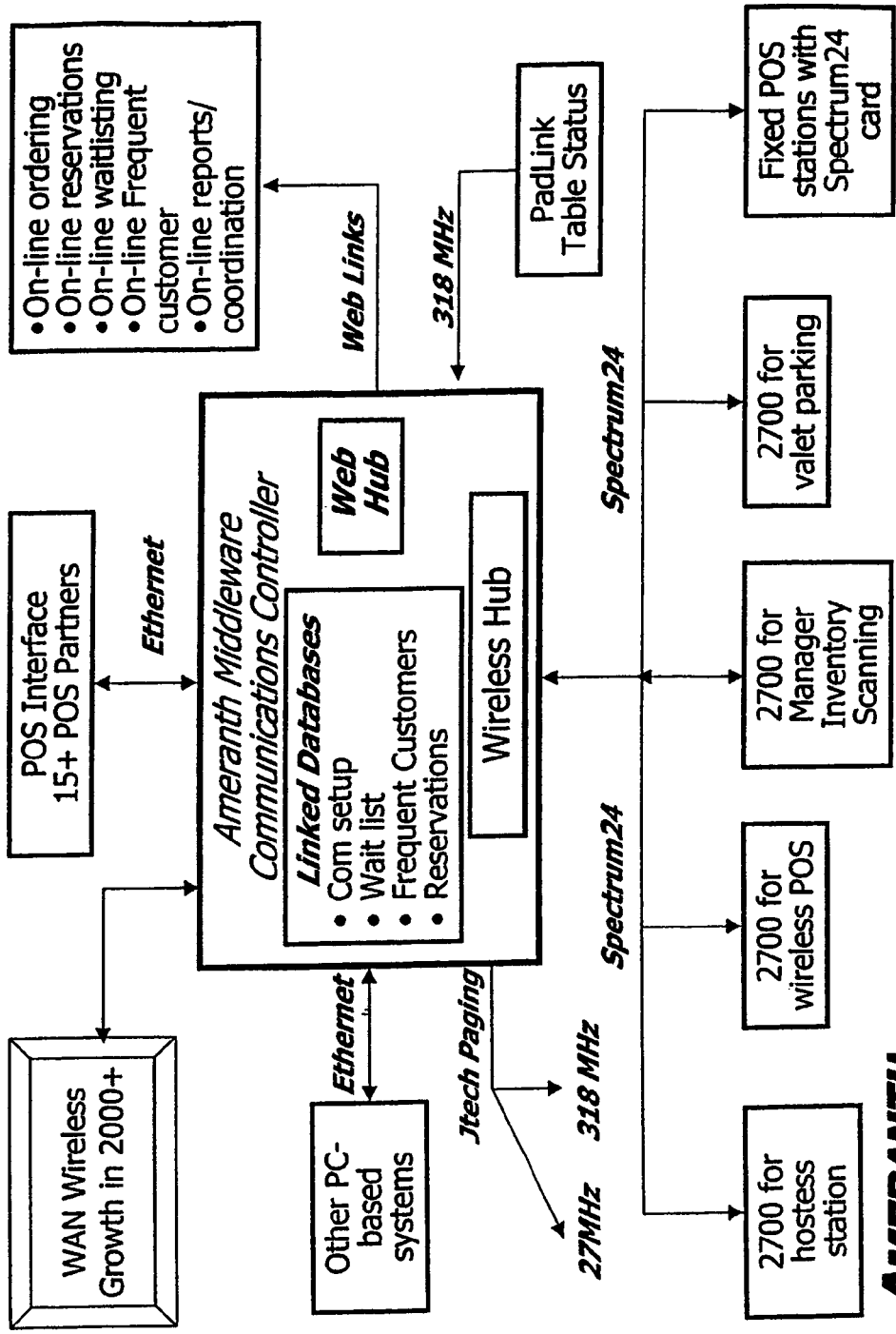
FIG. 9 is an exemplary system diagram relating to embodiments of the present invention.

A communications control program monitors and routes all communications to the appropriate devices. It continuously monitors the wireless network access point and all other devices connected to the network such as pagers, remote devices, internet Web links and POS software. Any message received is decoded by the software, and then routed to the appropriate device. No user action is needed during operation of the software once the application has been launched. To launch the communications control module, a Wireless Traffic icon is clicked on the desktop PC. When the program loads, the screen shown in FIG. 6 appears. Messages received are logged in the window 14 shown in FIG. 6 with a time stamp. The messages are also logged to a file on the hard drive. This provides a mechanism to monitor all traffic across the network (possibly useful for troubleshooting, or maintenance, but not necessary for normal operation). The program may be minimized so the screen is not displayed on the desktop, but it must be running for proper communications to exist between all devices on the network.

As stated, the preferred embodiment of the present invention includes the use of and compatibility with GUI technology. A drag-and-drop approach is used for organizing the tree structure 2 in the generated menu. Drag-and-drop is also used for assigning modifiers (modifiers can be dragged from the modifiers window 5 and dropped onto the menu item 4 for assignment). In-cell editing results in fast editing of items in building the menus. Customizable fonts enable users to change font types, style and size. Customizable layouts enable users to resize windows, change icons and display preferences. The inventive approach provides for fully persistent storage between sessions, even if a session is improperly or abruptly terminated. Font and the tree state (i.e., which nodes are expanded/collapsed) are stored between sessions. Layout for modifiers and sub-modifiers list views (filter, columns, formatting, font, etc.) are stored between sessions. The last database used is likewise stored between sessions. Splitter views allow the user to see different views at the same time. Each view is displayed on its own section of the screen. Views can be resized via the keyboard or a mouse by simply dragging the splitter in the middle.

An automated function is provided to import existing POS databases into the inventive menu generation system and, as discussed above with respect to the detailed example of how to use the preferred embodiment, an automated download procedure is provided to transfer the desktop database onto a handheld device and/or Web page. Also as discussed, the preferred embodiment facilitates preview of the handheld device or Web page version of the POS menu on the desktop before downloading and configuration. Customizable desktop menu generation is contemplated, as discussed above, in the form of customizable fonts, columns, layouts, etc. The inventive approach also includes templates for common modifiers that can be assigned to similar menu items. The preferred embodiment also supports multiple databases, thus providing for the creation and storing of different menu databases on handheld devices such as breakfast, lunch or dinner menus. The user can then select the appropriate database to reflect the time of day.

Figure 7:
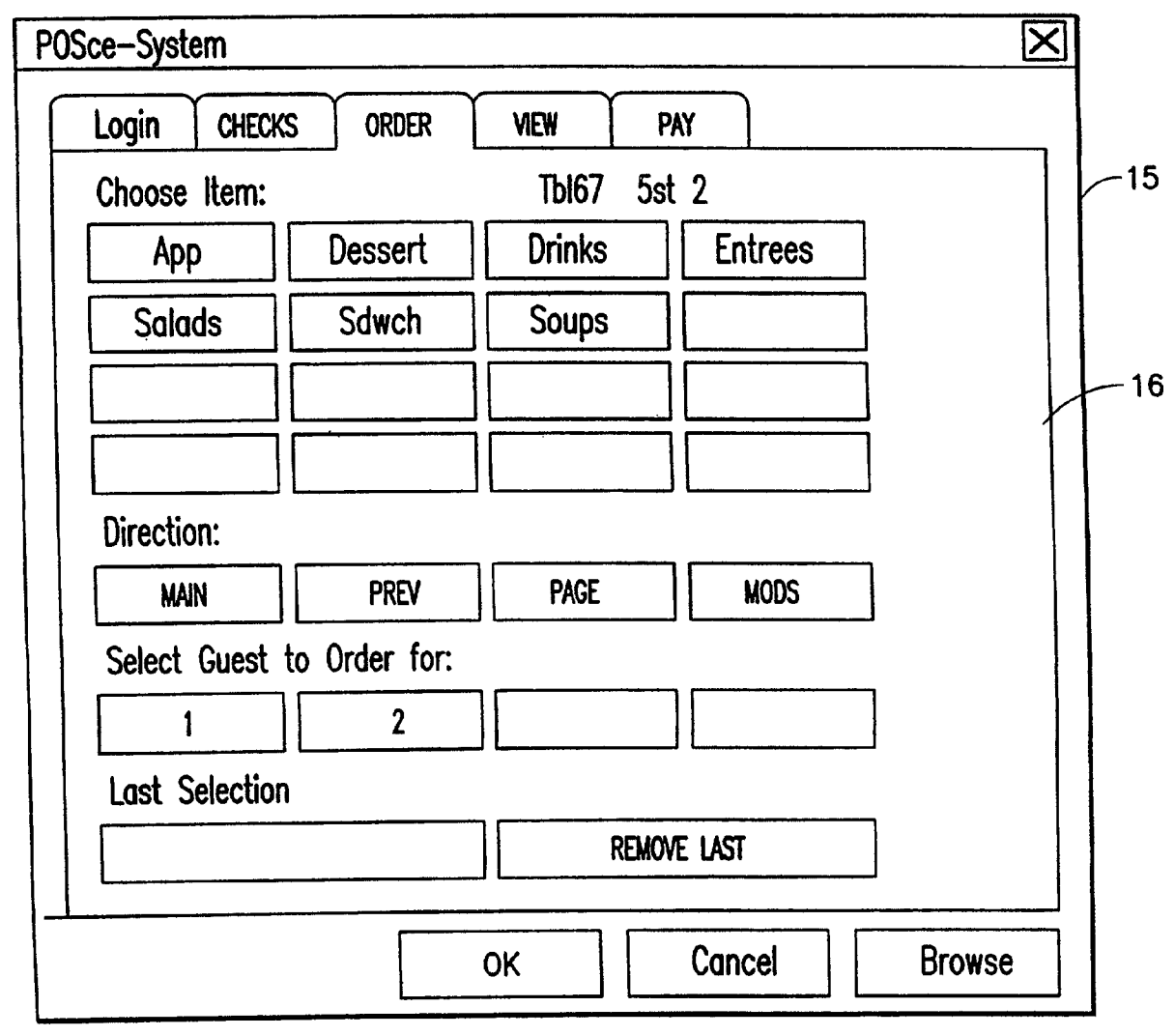

FIG. 7 is a schematic representation of a point of sale interface 15 for use in displaying a page-type menu 16 created using the inventive menu generation approach. As can be seen from FIG. 7, the page menu is displayed in a catalogue-like point-and-click format whereas the master menu, FIG. 1, is displayed as a hierarchical tree structure. Thus, a person with little expertise can "page through" to complete a transaction with the POS interface and avoid having to review the entire menu of FIG. 1 to place an order. A PDA or Web page format could appear like FIG. 7 or the display could be configured for particular requirements since fully customizable menu generation and display are contemplated.

The POS interface on the handheld device supports pricing in the database or querying prices from the POS server. The POS device also can be customized with respect to "look and feel" for the particular version. As can be seen in FIG. 7, the POS interface provides for billing, status and payment with respect to orders. A myriad of options can be provided depending on the application.

Advanced database functions are provided in the preferred embodiment of the invention, including an automated download process onto handheld devices and/or Web sites. In the preferred embodiment, the menu generation system of the present invention uses an API called ActiveX Data Objects ("ADO") for database access. ADO is useful in a variety of settings. It is built on top of OLE DB and can be used to talk to databases and, in the future, any data source with any OLE DB driver. Advanced querying is supported. The database can be queried on virtually all fields. Queries can be built using SQL syntax for experienced users or can be created using a query builder which guides users through the creating process. Advanced error handling is supported. Errors occurring at run time can be trapped. A descriptive message is displayed to alert the user and provide error information. However, the application does not terminate when the errors happen. The source code is easy to maintain and modify, thus allowing for on time delivery of customized versions of the software. The advanced database functions produce well-designed databases that accommodate growth and scalability The inventive menu generation approach provides a solution for the pervasive connectivity and computerization needs of the restaurant and related markets. The inventive solution includes automatic database management and synchronization, PDA and handheld wireless operating system integration and optimization, wireless communications and internet connectivity, user interface design, and graphics design.

In the preferred embodiment, the menu generation approach of the present invention uses Windows CE® as the operating system for the handheld devices. Windows CE® provides the benefits of a familiar Windows 95/98/NT® look and feel, built-in synchronization between handheld devices, internet and desktop infrastructure, compatibility with Microsoft Exchange®, Microsoft Office 9® and TCP/IP quick access to information with instant-on feature.

Windows CE® provides a basic set of database and communication tools for developer use. However, interfacing with these tools to provide application specific results can be a complex task. In addition to the menu generation described above, a set of software libraries described herein in conformance with the present invention not only enhances the basic Windows CE® functionality by adding new features but also maximizes the full potential of wireless handheld computing devices. Such features include fast synchronization between a central database and multiple handheld devices, synchronization and communication between a Web server and multiple handheld devices, a well-defined API that enables third parties such as POS companies, affinity program companies and internet content providers to fully integrate with computerized hospitality applications, real-time communication over the internet with direct connections or regular modem dialup connections and support for batch processing that can be done periodically throughout the day to keep multiple sites in synch with the central database.

The synchronous communications control module discussed above provides a single point of entry for all hospitality applications to communicate with one another wirelessly or over the Web. This communications module is a layer that sits on top of any communication protocol and acts as an interface between hospitality applications and the communication protocol. This layer can be easily updated to work with a new communication protocol without having to modify the core hospitality applications. The single point of entry works to keep all wireless handheld devices and linked Web sites in synch with the backoffice server (central database) so that the different components are in equilibrium at any given time and an overall consistency is achieved. For example, a reservation made online is automatically communicated to the backoffice server which then synchronizes with all the wireless handheld devices wirelessly. Similarly, changes made on any of the wireless handheld devices will be reflected instantaneously on the backoffice server and the other handheld devices. In various embodiments, the reservation might be converted into one or more messages (e.g., text messages and/or instant messages), and/or text-to-voice functionality might be employed to allow direct interaction via any telephone.

The software applications for performing the functions falling within the described invention can be written in any commonly used computer language. The discrete programming steps are commonly known and thus programming details are not necessary to a full description of the invention.

A simple point-to-point wireless capability is contemplated which permits simple digital messages to be sent from the wireless handheld devices to a receiver in a beeper and/or valet parking base-station. The POS interface of FIG. 7 is representative of the display on a typical wireless device used in conformity with the invention. A simple protocol is used to acknowledge receipt of the message and thus simultaneous communication is not necessary, which reduces the cost of the wireless link. The range of the wireless link is determined by the characteristics of the radio transceiver. Adding a wireless link allows paging of beeper equipped customers directly from the operator interface on the wireless handheld devices and communication to and from various input/output transmitters and receivers to update the status of the order, reservation or other information and thus further reduce the workload on the operator and enable operations to proceed much faster. This link could also be hardwired or otherwise implemented using any two-way messaging transport. According to various embodiments of the present invention, messaging (e.g., wireless text messaging and/or wireless instant messaging) and/or text-to-voice functionality may be employed, for instance, in appointment, waitlist, and/or reservation operations. Such functionality might, in various embodiments, involve messaging (e.g., wireless messaging), text-to-voice, and/or two-way interactivity, and/or may involve communication via landline telephones, cellular telephones, and/or wireless devices.

Such functionality may be implemented in a number of ways. So as to illustrate by way of example, employing such functionality in the making of appointments and/or reservations will be discussed. It is noted that, in various embodiments, reservations functionality might include the use of waitlists. It is further noted that, in various embodiments, waitlist requests (e.g., in restaurants and/or casinos) might be viewed as short-term and/or on-the-spot reservation requests.

A user (e.g., a customer or staff member) desiring to make an online appointment and/or reservation for an entity (e.g., a restaurant, a plumber or other repair service, a hair salon, a healthcare establishment (e.g., a doctor's office, dentist's office, or hospital), or a pet groomer) might, for example, employ a web page (e.g., of a web portal) to specify the desired entity. As another example, the user might employ a web page (e.g., of a web portal) as a means of remote access.

The user might, for example, choose the entity from entities listed by the web page. Such listed entities might, for instance, be ones matching criteria specified by the user. Such criteria might, for example, include location, type, and/or price range. Having specified the entity for which he wished to make an appointment and/or reservation, the user might be able to specify relevant information such as, for instance, name under which the appointment and/or reservation should be made, number of people, desired appointment and/or reservation date, and/or desired appointment and/or reservation time. In various embodiments, the user might be able to specify alternatives for various of such information (e.g., specifications of second and/or third choices for desired appointment and/or reservation time). Specifications might, for instance, be via one or more links and/or other GUI elements provided by the web page.

It is noted that, in various embodiments, the user might be able to specify multiple desired entities. For example, the user might be able to specify that he desires to make an appointment and/or reservation with each of multiple specified entities. As another example, the user might be able to specify that he desires that an appointment and/or reservation be made with only one of multiple specified entities. For instance, in various embodiments the user might be able to rank specified entities, and an appointment and/or reservation could be made on behalf of the user with the highest ranking entity for which an appointment and/or reservation could be successfully made.

To illustrate by way of example, the user might specify three restaurants, ranked "1", "2", and "3", with "1" being the most desirable. In the case where appointment and/or reservation with restaurant "1" was not possible, but appointment and/or reservation with each of restaurants "2" and "3" was possible, appointment and/or reservation could be made on behalf of the user with restaurant "2".

With the user having provided such information, one or more operations could be performed to communicate with the entity in a manner employing automated messaging (e.g., automated wireless messaging). Such automated messaging might, for example, involve an automated telephone call wherein some or all of the information provided by the user is automatically converted to spoken words (e.g., via text-to-voice) and conveyed to the entity. As another example, such automated messaging might involve automated text messaging (e.g., automated wireless text messaging) and/or automated instant messaging (e.g., automated wireless instant messaging) wherein some or all of the information provided by the user is automatically converted to text and/or data and conveyed to the appropriate entity.

Figure 10:
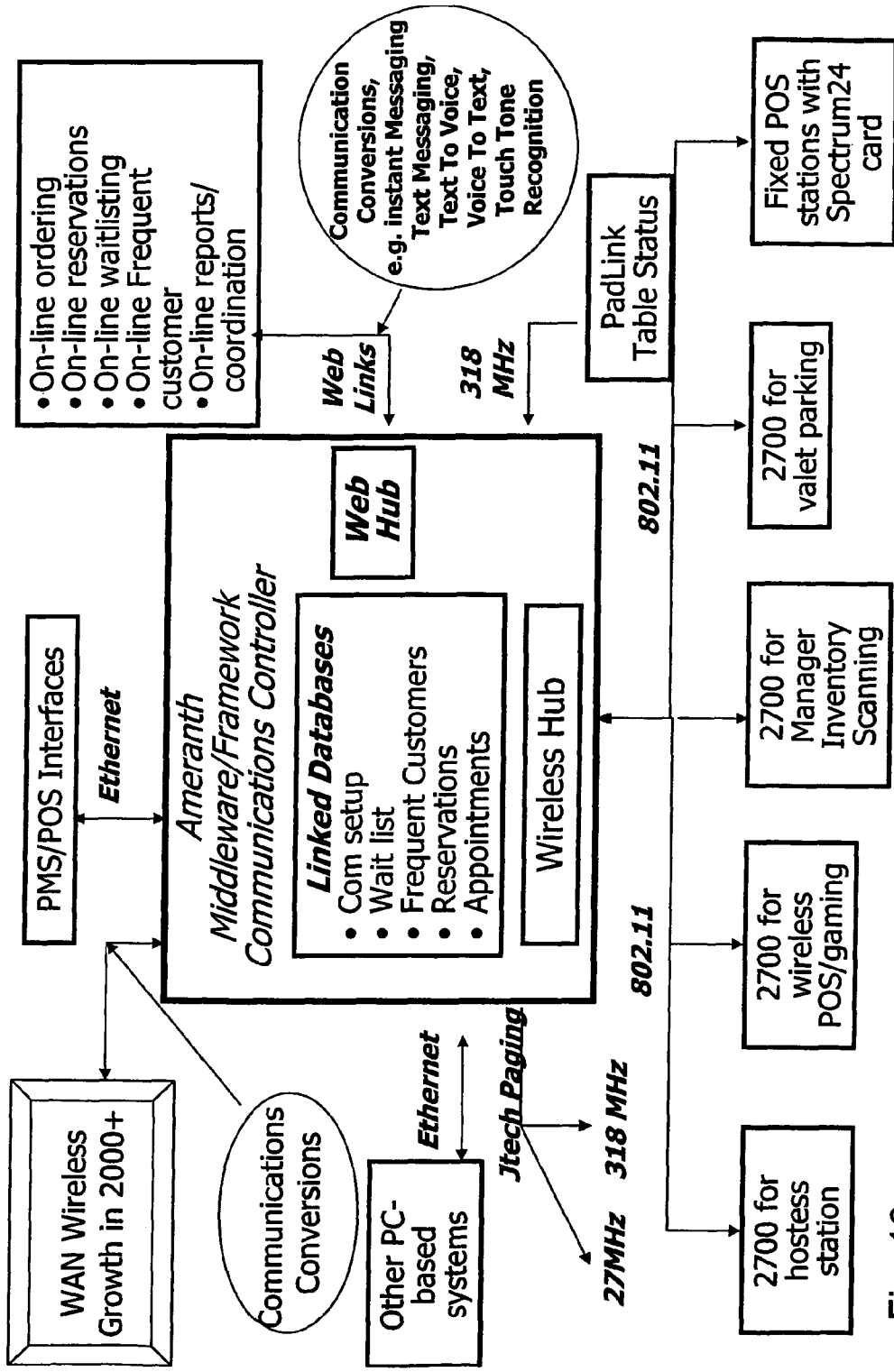
FIG. 10 is a further exemplary system diagram relating to embodiments of the present invention.

For example, a computer (e.g., a server) might act to contact the entity in an automated manner. The computer might, for example, determine the phone number of the entity (e.g., via database lookup) and place an automated telephone call to the entity. As another example, the computer might, alternately or additionally, determine a messaging address and/or telephone number of the entity (e.g., via database lookup) and send a message (e.g., of the sort discussed above) in an automated manner to the entity. In placing such a telephone call and/or sending such a message the computer might, for example, use integrated and/or peripheral telephone access hardware and/or voice synthesis hardware. It is noted that, in various embodiments, the computer might act to provide the webpage to the user. Alternately or additionally, in various embodiments the webpage might be provided by other than the computer. In various embodiments, as this process continues, synchronization (e.g., database synchronization throughout the system network) may be maintained (e.g., as shown in FIG. 10). It is noted that, in various embodiments, such synchronization may occur at all times.

With the message and/or call being answered at the entity, the computer might perform one or more operations. For example, the computer might convey (e.g., subsequent to automatic conversion of information provided by the user) the desired appointment and/or reservation to the entity. The computer might, in various embodiments, further convey the source of the entity (e.g., the name of a web page and/or company employed by the user in making the appointment and/or reservation). To illustrate by way of example, the computer might speak:

"Hello, this is your automated reservations assistant. I have a new reservation for you. The reservation is for Mr. Smith, party of 6, for May $1^{st}$".

In various embodiments, similar information might be conveyed by the computer via messaging (e.g., via automated wireless messaging).

Having conveyed the desired appointment and/or reservation, the computer might, for instance, seek one or more responses from the entity. The computer might, for example, seek responses entered via touch tone keypad via the call. Such entered response might, for instance, be automatically converted via touch tone recognition technology. As another example, the computer might seek spoken responses via the call. Such spoken responses might, for instance, be automatically converted via voice recognition technology (e.g., of the sort discussed above). As another example, such spoken responses might be automatically converted, captured, and/or stored, and be presented to the user (e.g., via the web page, telephone call, and/or messaging). In seeking responses, the computer might perform one or more operations.

For example, the computer might speak to indicate that "1" should be spoken and/or pressed by an individual affiliated with the entity who answers the phone in the case where the appointment and/or reservation is acceptable, that "2" should be spoken and/or pressed in the case where the appointment and/or reservation is denied, that "3" should be spoken and/or pressed in the case where it is desired that the user seeking the appointment and/or reservation call the entity to make other arrangements, and that "4" should be spoken and/or pressed to relay a voice message instruction to the user. The computer might, in various embodiments, seek similar information via messaging (e.g., automated wireless messaging). Such a relayed voice message might, for instance, be presented to the user in a manner analogous to that discussed above (e.g., via web page, telephone call, and/or messaging). The relayed voice message might, in various embodiments, be automatically converted for such presentation to the user. With the individual affiliated with the entity specifying one of the choices, the computer might, for example, make note of the selection, and/or process and/or store the selection for integration with one or more operations discussed herein (e.g., synchronization). Synchronization might, in various embodiments, be performed as shown in FIG. 10.

It is noted that, in various embodiments, in the case where the computer was not able to successfully reach the entity and/or receive a valid response from the entity, the computer might keep trying and/or try alternate contact modes. Alternately or additionally the computer might in various embodiments, if appropriate, attempt to contact one or more other entities. As noted above, in various embodiments of the present invention the user might be able to specify that he desires that an appointment and/or reservation be made with only one of multiple specified entities (e.g., with the user ranking the specified entities). The computer might, in various embodiments, attempt to reach (e.g., in a manner discussed above) each of such multiple specified entities seeking appointment and/or reservation. For example, the computer might attempt to reach each of such multiple specified entities in one or more orders corresponding to user ranking (e.g., attempting to reach the highest-ranking entity first). The computer might, in various embodiments, stop attempting to reach such multiple specified entities in the case where an appointment and/or reservation was successfully made. It is noted that such functionality could, in various embodiments, occur without human action on the part of the user and/or a provider of the web page.

The computer might, in various embodiments, act to pursue multiple entities in parallel. In so pursuing entities in parallel the computer might, for example, present to the user results and/or progress of its work (e.g., as appointment and/or reservation availability results), and/or allow the user to select from presented possibilities a desired choice. The multiple entities so pursued might, in various embodiments, be automatically chosen by the computer. For example, the computer might choose the multiple entities in accordance with matches to search criteria (e.g., real-time search criteria). As another example, the computer might, alternately or additionally, choose the multiple entities in accordance with previously established (e.g., stored) user unique lists (e.g., a list of the user's 15 favorite restaurants).

To illustrate by way of example, the user might learn of restaurants for which appointment and/or reservation could be secured (e.g., for a particular date and time), and select from those a desired restaurant. Such communication with the user might, for example, be implemented in a manner analogous to that discussed above.

It is additionally noted that, in various embodiments, multiple modes of contact might be available to the computer for communicating with the entity. For example, the computer might be able to employ one or more telephone calls, web pages, emails, pages, facsimiles, instant messages, and/or text messages conveying (e.g., subsequent to automatic conversion of information provided by the user) the desired appointment and/or reservation, and/or seeking responses from the entity. As another example, the computer might be able to receive and/or interpret (e.g., with automatic conversion of information provided by the entity) one or more telephone calls, web pages, emails, pages, facsimiles, instant messages, and/or text messages conveying the entity's responses. In various embodiments, in the case where one mode of contact was not successful, another mode might then be tried.

In various embodiments, the entity might be able to offer one or more alternate appointments and/or reservations (e.g., in the case where a desired appointment and/or reservation could not be provided). Such functionality might be implemented in a number of ways. The entity might, in various embodiments, be able to specify that such an suggested alternate appointment and/or reservation would be held until a particular date and/or time, and/or that such an suggested alternate appointment and/or reservation would not be held, and that the user was advised to provide a decision regarding the acceptability of the suggested alternate appointment and/or reservation by a specified time and/or date. Accordingly, in various embodiments, in the case where the user did not indicate such an suggested alternate appointment and/or reservation to be acceptable by the termination of the hold, the corresponding inventory (e.g., availability inventory) might be freed up for use by others. The provision of one or more alternate appointment and/or reservation times, dates, and/or other information by an entity might, for example, be via touch tone keypad, voice, preset availability, and/or messaging. In various embodiments, one or more databases and/or computers might come to know of the results of communicating with the entity, one or more statistics might be stored, updated, and/or generated, and/or one or more reports might be stored, updated, and/or generated (e.g., as shown in FIG. 10). Accordingly, for instance, one or more records of appointments and/or reservations and/or availabilities for the entity might be updated. Some or all of such results, statistics, and/or reports might, in various embodiments, be accessible (e.g., via web page and/or via text-to-voice) by, for instance, entities and/or system administrators. In various embodiments, a password and/or identifier (e.g., an access code) might need to be provided. Additionally, in various embodiments, management alerts to various criteria (e.g., preset criteria) might be generated. Such alerts (e.g., late appointments and/or a patent being late for a required action in a hospital) might, for example, be automatically communicated to the appropriate management staff of the appropriate entity when corresponding criteria were met. Communication of such alerts might, for instance, be performed in a manner analogous to that discussed above (e.g., via automated telephone call employing text-to-voice, automated text messaging, and/or automated instant messaging).

The user seeking the appointment and/or reservation could, in various embodiments, come to know of the results of communicating with the entity (e.g., subsequent to automatic conversion of information provided by the entity). For example, the user might be informed by way of web page, email, page, telephone call (e.g., employing text-to-voice), facsimile, instant message, and/or text message. In various embodiments, a password and/or identifier (e.g., an access code) might need to be provided. In embodiments where one or more alternate appointments and/or reservations were suggested by the entity, the user might be able to indicate the acceptability of those alternate appointments and/or reservations. The entity could then, in various embodiments, be made aware of the user's response. Such functionality for communicating with the user and/or entity might, for instance, be implemented in a manner analogous to that discussed above (e.g., automatic conversion might be employed).

A computer operating to communicate with the entity as discussed herein might, for example, be dedicated to performing such operations. As another example, such a computer might be one performing other tasks (e.g., acting as a web server). It is noted that, in various embodiments, one or more rules may be followed in communicating with the entity and/or the user. For example, a rule might specify that the entity and/or the user is not to be telephoned and/or be sent messages before and/or after certain hours of the day. As another example, a rule might specify that one mode of contact (e.g., telephone call) is to be employed as a means of contact for certain hours of the day, while a second mode of contact (e.g., instant messaging) is to be employed as a means of contact for other hours of the day.

It is noted that, according to various embodiments of the present invention, an entity might be able to update inventory (e.g., available tables and/or seats). Accordingly, for instance, the entity might be able to indicate an increase and/or decrease in inventory. In various embodiments, a password and/or identifier (e.g., an access code) might need to be provided.

Such functionality might be implemented in a number of ways. For example, telephone call, web page, email, facsimile, instant message, and/or text message might be employed. To illustrate by way of example, an individual affiliated with the entity might call a telephone number and be greeted with text-to-voice speech prompting for code and password to be entered via touch tone keypad and/or be spoken. The text-to-voice speech might then prompt the user to employ touch tone keypad and/or voice in increasing or decreasing inventory (e.g., availability inventory), and/or employ touch tone keypad and/or voice in specifying one or more new inventory values. Such functionality might, in various embodiments, be implemented by a computer such as one, for instance, operating in a manner analogous to that discussed above.

It is noted that, in various embodiments, an entity might be able to indicate that one or more portions of inventory (e.g., availability inventory) be set aside for one or more particular purposes. For example, an entity might be able to specify that a portion of inventory be set aside for walk-ins, and/or that a portion of inventory be set aside for conventional telephone appointments and/or reservations.

It is additionally noted that, in various embodiments, a computer interacting with a user desiring to make an online appointment and/or reservation (e.g., as discussed above) might take into account such inventory information in interacting with the user. For example, the user might be prevented from specifying a desired appointment and/or reservation date and/or time known by the computer to correspond to inventory that was not available.

In various embodiments, synchronization might be performed. Such synchronization might, for instance, be of the sort discussed herein (e.g., as shown in FIG. 10). For example, synchronization might occur between one or more computers that operate to communicate with the entity, one or more computers that operate to communicate with the user, one or more web servers, one or more web sites, one or more cell phones (e.g., smartphones) and/or PDAs, and/or one or more backoffice servers (central databases). To illustrate by way of example, appointments and/or reservations data, and/or inventory data might be synchronized. It is noted that such computers, servers, and/or web sites may, for example, employ software programmed to employ one or more of the operations discussed above.

It is noted that via various of the operations discussed above, the need for personal computers and/or terminals (e.g., network-connected computers and/or terminals) at entity locations (e.g., restaurants) may be eliminated. For example, in various embodiments a telephone (e.g., a landline or cellular telephone) may be the only equipment needed by an entity (e.g., a restaurant or salon).

It is further noted that, in various embodiments, various of the operations discussed above may be implemented in a manner that enhances existing systems (e.g., web-based systems) such as, for instance, existing systems for reservation, appointment, orders, and/or waitlisting.

The functionality discussed above may be employed in a number of ways. For example, in various embodiments the functionality discussed above might be employed in ways including reservations, appointments, and/or waitlisting for entities such as, for example, restaurants, hotels, casinos, hair salons, pet groomers, and/or repair services (e.g., plumbers).

Shown in FIG. 10 is an exemplary system diagram relating to embodiments of the present invention wherein, for example, various of the functionality discussed above (e.g., messaging, text-to-voice, and communications with landline telephones, cellular telephones, and wireless devices) is depicted.

A further aspect of the invention is the use of the menus generated in accordance with the described technique to place orders from wireless remote handheld devices or from remote locations through the internet. The World Wide Web is a distributed hypermedia computer system that uses the internet to facilitate global hypermedia communication using specified protocols. One such protocol is the Hypertext Transfer Protocol ("HTTP"), which facilitates communication of hypertext. Hypertext is the combination of information and links to other information. In the context of the Web, hypertext is defined by the Hypertext Mark-up Language ("HTML"). The links or hyperlinks in a HTML document reference the locations of resources on the Web, such as other HTML documents. Another language used in creating documents for use on the Worldwide Web, to display on computer screens, or to create speech style sheets for use in, e.g., telephones, is the Extensible Mark-Up Language ("XML"). XML is a "metalanguage", i.e., a language for describing languages which was developed to eliminate the restrictions of HTML.

The Web is a client-server system. The HTML documents are stored on Web server computers, typically in a hierarchical fashion with the root document being referred to as the home page. The client specifies a HTML document or other source on the server by transmitting a Uniform Resource Locator ("URL") which specifies the protocol to use, e.g., HTTP, the path to the server directory in which the resource is located, and filename of the resource. Users retrieve the documents via client computers. The software running on the user's client computer that enables the user to view HTML documents on the computer's video monitor and enter selections using the computer's keyboard and mouse is known as a browser. The browser typically includes a window in which the user may type a URL. A user may cause a URL to be transmitted by typing it in the designated window on the browser or by maneuvering the cursor to a position on the displayed document that corresponds to a hyperlink to a resource and actuating the mouse button. The latter method is commonly referred to simply as "clicking on the hot-spot" or "clicking on the hyperlink". The hyperlink methodology is contemplated for use in accordance with the preferred embodiment to transmit orders via the internet.

Web server application software exists that enables a user to shop for and order merchandise. Such systems are sometimes referred to as electronic merchandising systems or virtual storefronts. Systems that enable a user to choose among several retailers' goods are sometimes referred to as electronic malls. An electronic retailer's or electronic mall operator's Web server provides HTML forms that include images and descriptions of merchandise. The user may conventionally search for an item by entering a key word search query in a box on a form. When a user selects an item, the server may provide a linked form that describes that item in further detail. The user may also conventionally enter ordering information into boxes on the form, such as the type and quantity of the item desired. The information entered by the user is transmitted to the server. The user may select multiple items in this manner and then enter a credit card number to pay for the purchases. The retailer processes the transaction and ships the order to the customer. As can be appreciated, ordering merchandise can also be done from menus. The generation of menus of items or merchandise for sale over the internet is readily accomplished by the menu generation approach of the present invention.

Searching for items that the user is interested in purchasing is insufficient in prior merchandising systems. Database management programs use index searching to facilitate rapid searching of large amounts of data. The creator of the database may instruct the program to use specified fields in the database as indexed or key fields. The program locates all terms in the database that appear in the indexed fields and stores them in an index table. Each entry in the index table includes a term and corresponding pointer to the location in the database where the term is found. If a user initiates a search for a term that is present in the index table, the program can locate the instances of that term in the database with exceptional speed. Users who are familiar with the particular database they are searching will generally know which fields are indexed and will know the format of the data in those fields. For example, a user of a database containing the inventory of a bookstore may know that users can search for the names of authors of books and that a user who wishes to do so should enter the author's last name first. A user having such knowledge will therefore be able to search efficiently. Users of electronic merchandising systems, however, are generally end-consumers who have no knowledge of a merchant's database. If, as is very likely, such a user initiates a search for a term that is not present in the index table, the program must sequentially search through all records in the database. Sequential records are typically linked by pointers. Using pointers in this manner is very demanding on server resources, resulting not only in an exceptionally slow search, but also creating a bottleneck for other processes that the server may be executing. The menu generation approach of the present invention can be used to create customized menus from a database that includes every item of merchandise the vendor has for sale. In this manner, customers can scan the generated menu much more readily than they could view the entire database and the necessity of having familiarity with the database is eliminated as well, reducing the need for resource intensive pointers.

While the preferred embodiment of the invention is for the generation of restaurant menus and the like, the broad scope of the invention is far greater. For example, menus generated in accordance with the invention can be used in the desktop computing environment in association with the operating system or application programs. One such use is to facilitate the creation of user personalized file structures for general desktop use. Another use is to facilitate the location of customized menus from master menus for use in association with application software to make the execution of the application software more efficient by, e.g., eliminating the necessity of querying or checking every tree branch in the master menu file structure in response to user input or other criteria and to create handheld/PDA compatible versions of the software.

While the preferred embodiment of the invention includes the selection of items from a master menu wherein the master menu is displayed using a graphical user interface, it is to be appreciated that any means for displaying the master menu to the user and generating another menu in response to and comprised of the selections made is encompassed by the contemplated invention. The invention encompasses the selection of nontextual symbols, characters, icons and the like, in addition to text, from a hierarchical tree menu or the like for generation of another menu comprised of such items.

It is also within the scope of the invention to generate menus automatically in response to predetermined criteria. For example, in the restaurant menu generation embodiment, a modified menu can be generated to comply with a particular specification or group of criteria such as, e.g., "dinner", "low cholesterol", "low fat", "fish", "chicken", or "vegetarian". In this embodiment, only items from the master menu that satisfy specified parameters will be included in the generated menu. The selection process could involve selection of master menu items based on tags or identifiers associated with the items or by checking every master menu item against a dictionary of items acceptable for inclusion in the modified menu. It should also be appreciated that the invention encompasses any combination of automatic and manual user selection of the items comprising the generated menu. For example, a user might specify criteria which would further control automatic selection or the user could manually select some items with automatic selection of others. The menu generation aspect of the invention is equally applicable to table-based, drive-thru, internet, telephone, wireless or other modes of customer order entry, as is the synchronous communications aspect of the invention.

The inventive concept encompasses the generation of a menu in any context known to those skilled in the art where an objective is to facilitate display of the menu so as to enable selection of items from that menu. The restaurant menu generation embodiment is but one example of a use for the inventive concept. Likewise, displaying menus generated in accordance with the invention on PDAs and Web pages to facilitate remote ordering are but a few examples of ways in which such a menu might be used in practice. Any display and transmission means known to those skilled in the art is equally usable with respect to menus generated in accordance with the claimed invention.

In the more general situation, menus can be generated in accordance with the present invention in a variety of situations. For example, the usable file structure for a particular data processing application can be dictated by the user or an application program prior to or during the execution of the application program. Efficiencies with respect to computational speed and equipment, e.g., storage and processor, usage can thus be achieved along with the facilitation of display of the generated menu.

While the best mode for carrying out the preferred embodiment of the invention has been illustrated and described in detail, those familiar with the art to which the invention relates will recognize various alternative designs and embodiments which fall within the spirit of practicing the invention. The appended claims are intended to cover all those changes and modifications falling within the true spirit and scope of the present invention.

That which is claimed is:

1. An information management and real time synchronous communications system for use with wireless handheld computing devices and the internet comprising:
    a. a master database containing at least one hospitality application and associated data,
    b. application software configured to present hospitality data for display on a display of at least one wireless handheld computing device in which the at least one hospitality application is also stored,
    c. at least one Web server configured by application software to interface with at least one hospitality application and its associated data,
    d. application software configured to present hospitality data for display on at least one web page,
    e. an applications programming software interface, and
    f. a real time application software communications control module with a systemic communications relationship comprising:
        a communications controller
        a communications set up
        a web Hub
        a wireless Hub
    wherein the system is configured to perform an automated communications conversion via application software involving the data associated with the at least one hospitality application,
    wherein the system is configured via application software to synchronize the at least one hospitality application and its associated data with data in a second and different hospitality application in real time between the master database, the at least one Web server, the at least one wireless computing device and the at least one web page,
    wherein the real time application software communications control module is configured via application software to act as an interface between the at least one hospitality application and any applicable communications protocol.

2. The system of claim 1, wherein the at least one synchronized hospitality application is a restaurant service or ordering or wait-listing or reservations or frequency or point of sale or inventory or ticketing application.

3. A system as in either of claim 1 or 2, in which the system further includes at least one payment processing application.

4. A system as in claim 1, further configured to automatically perform the communication conversion via text to voice conversion.

5. A system as in claim 1, further configured to automatically perform the communication conversion via voice to text conversion.

6. A system as in claim 1, further configured to automatically perform the communication conversion via text to text messaging conversion.

7. A system as in claim 1, further configured to automatically perform the communication conversion via touch tone recognition to text conversion.

8. A system as in claim 1, further configured to automatically perform the communication conversion via text to instant messaging conversion.

9. A system as in claim 1, further configured to automatically perform the communication conversion via text to email conversion.

10. A system as in claim 1, further configured to automatically perform communications conversions via two or more of text to voice conversion, voice to text conversion, text to text messaging conversion, touch tone recognition to text conversion, text to instant messaging conversion or text to email conversion.

11. A system as in claim 1, in which the interface with the at least one wireless handheld computing device also includes hospitality application software downloaded via the internet to and operable on the handheld device.

12. A system as in claim 1, in which the at least one wireless handheld computing device is a smart phone suitable for use by consumers.

13. An information management and real time synchronous communications system for use with wireless handheld computing devices and the Internet comprising:
    a. a master database containing hospitality applications and associated data,
    b. application software configured to present hospitality data for display on a screen of at least one wireless handheld computing device in which at least one of the hospitality applications is also stored,
    c. at least one Web server configured by application software to interface with at least one hospitality application and associated data,
    d. application software configured to present hospitality data for display on at least one web page, and
    e. a real time communications control module configured by application software to link and synchronize hospitality data between multiple and different hospitality applications
    wherein the system is configured by application software to synchronize hospitality applications and data in real time between the master database, the at least one wireless handheld computing device, the at least one Web server and the at least one Web page, and
    wherein the real time communications control module is also configured via application software to act as an interface between the at least one of the hospitality applications and any applicable communications protocol.

14. The system of claim 13, wherein the system is configured to enable the automatic importation into the system of information from a point of sale database.

15. A system as in any one of claim 13 or 14, in which the interface with the at least one wireless handheld computing device also includes hospitality application software downloaded via the internet to and operable on the handheld device.

16. A system as in claim 13, in which the at least one wireless handheld computing device is a smart phone suitable for use by consumers.

17. A system as in claim 13, in which the at least one wireless handheld computing device also includes payment processing functionality.

18. The system of claim 13, wherein the synchronized hospitality applications include restaurant service and inventory applications.

19. The system of claim 13, wherein the synchronized hospitality applications include ordering and frequency systems and reservations applications.

20. The system of claim 13, wherein the synchronized hospitality applications include wait-listing and frequency systems and point of sale applications.

21. The system of claim 13, wherein the synchronized hospitality applications include ordering and reservations and point of sale and inventory applications.

22. The system of claim 13, in which the synchronized hospitality applications further include payment processing applications.

23. The system of claim 13 in which the synchronized applications include a ticketing application.

\* \* \* \* \*